United States Patent (12)
Natori

(10) Patent No.: US 7,839,520 B2
(45) Date of Patent: Nov. 23, 2010

(54) PROGRAM, INFORMATION PROCESSOR AND PREVIEW METHOD

(75) Inventor: Hideo Natori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1118 days.

(21) Appl. No.: 11/186,893

(22) Filed: Jul. 22, 2005

(65) Prior Publication Data

US 2006/0023240 A1 Feb. 2, 2006

(30) Foreign Application Priority Data

Jul. 27, 2004 (JP) ............................. 2004-218823

(51) Int. Cl.
*G06F 15/00* (2006.01)
*G06F 3/12* (2006.01)
*G06K 1/00* (2006.01)
(52) U.S. Cl. .................................... 358/1.15; 358/1.13
(58) Field of Classification Search ........... 358/1.1–1.9, 358/1.11–1.18
See application file for complete search history.

(56) References Cited

U.S. PATENT DOCUMENTS 6,616,359 B1 * 9/2003 Nakagiri et al. ............. 400/582
2002/0054312 A1 * 5/2002 Tomita ....................... 358/1.13
2003/0103081 A1 * 6/2003 Ebuchi ........................ 345/764
2003/0103221 A1 6/2003 Natori ........................ 358/1.9
2003/0223094 A1 * 12/2003 Naito ......................... 358/1.15
2005/0088668 A1 * 4/2005 Sesek et al. .................. 358/1.1

FOREIGN PATENT DOCUMENTS

JP 2003-167721 6/2003

\* cited by examiner

*Primary Examiner*—Douglas Q Tran
(74) *Attorney, Agent, or Firm*—Fitzpatrick, Cella, Harper & Scinto

(57) ABSTRACT

A preview system utilizing an operating system standard spooler for spooling intermediate data converted from print data supplied from an application, including a print processor for implementing a print thread process and a preview thread process and a previewer for executing preview based on a bit map produced based on the above described spooled intermediate data, wherein the preview thread process of the above described print processor is started in accordance with commencement of a print process to start up the above described previewer, and the print thread process of the above described print processor is started up in the case where there is any job which has already finished undergoing preview or any job which has not yet undergone preview settings.

14 Claims, 18 Drawing Sheets

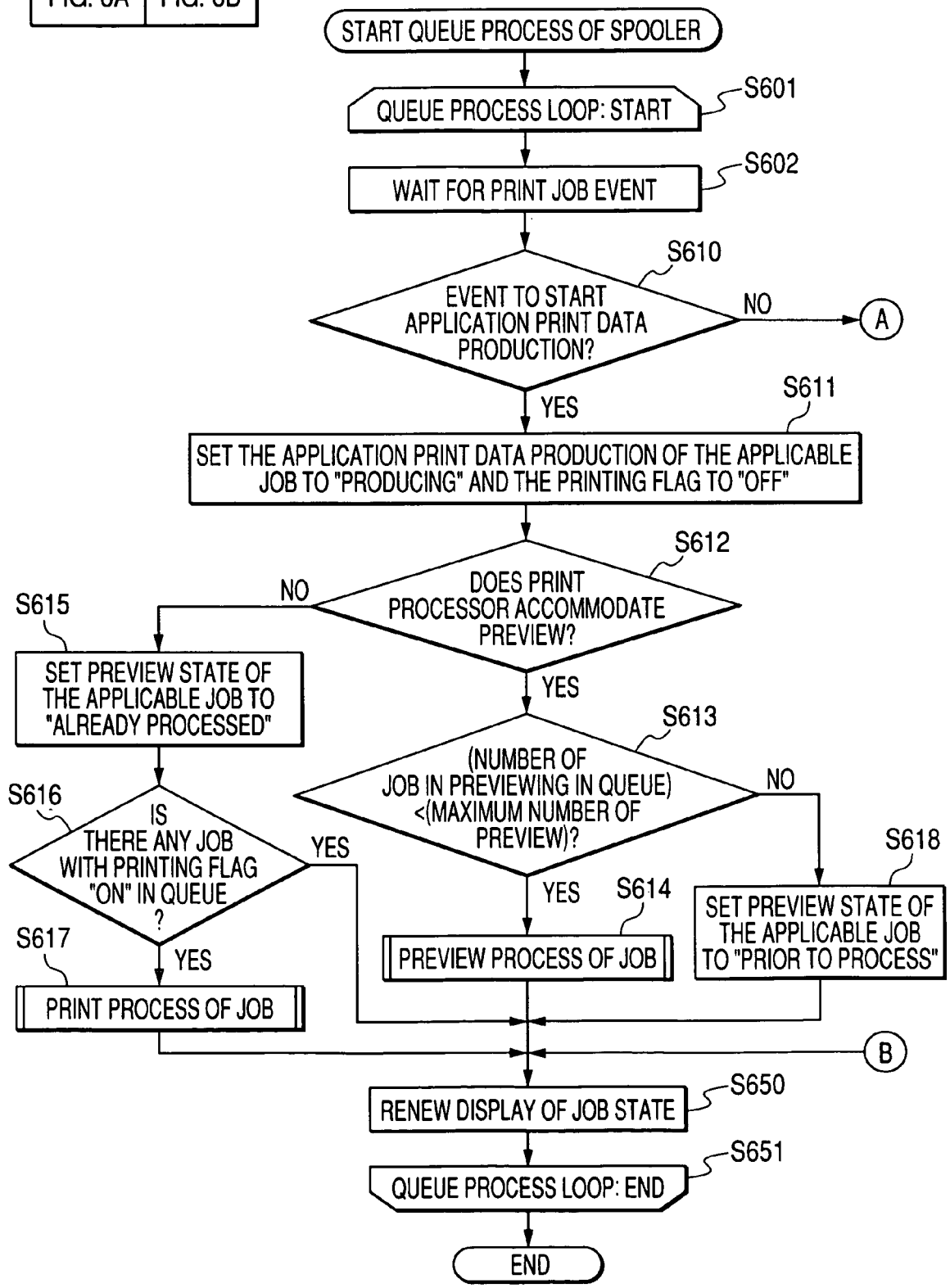

FIG. 9

| PRINTING FLAG | APPLICATION PRINT DATA PRODUCTION STATE | PREVIEW STATE | PRINT STATE DISPLAY |
|---|---|---|---|
| ON | ALREADY PRODUCED | ALREADY PROCESSED | PRINTING |
| ON | PRODUCING | ALREADY PROCESSED | PRINTING |
| OFF | ALREADY PRODUCED | ALREADY PROCESSED | SPOOL FINISHED |
| OFF | PRODUCING | ALREADY PROCESSED | SPOOLING |
| OFF | ALREADY PRODUCED | PROCESSING | PREVIEWING |
| OFF | PRODUCING | PROCESSING | PREVIEWING |
| OFF | ALREADY PRODUCED | PRIOR TO PROCESS | WAITING FOR PREVIEW |
| OFF | PRODUCING | PRIOR TO PROCESS | WAITING FOR PREVIEW |

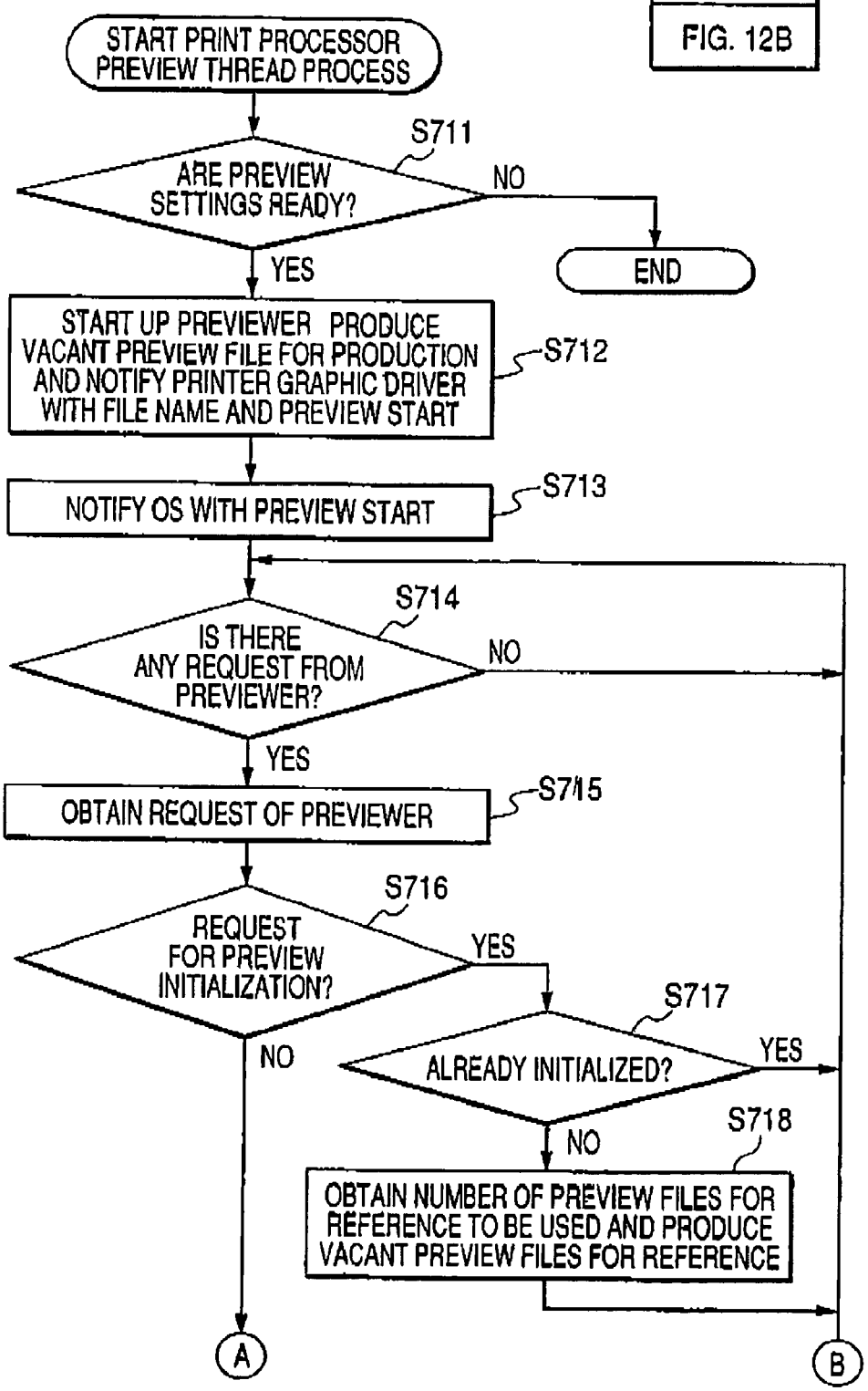

FIG. 13

PRINT PROCESSOR INTERFACE

| | |
|---|---|
| WINDOWS STANDARD FORM | FOR PRINTING: PRINTDOCUMENTONPRINTPROCESSOR ( )<br>FOR PREVIEW: NONE |
| FORM OF THE PRESENT EMBODIMENT | FOR PRINTING: PRINTDOCUMENTONPRINTPROCESSOR ( )<br>FOR PREVIEW: PREVIEWDOCUMENTONPRINTPROCESSOR ( ) |

FIG. 15

| FILE NUMBER | FILE NAME | PAGE NUMBER | RESOLUTION |
|---|---|---|---|
| 1 | CxxABCl.tmp | 1 | 96 |
| 2 | CxxXYZa.tmp | 1 | 200 |
| 3 | CxxXYZx.tmp | 2 | 96 |
| .. | .. | .. | .. |

PROGRAM, INFORMATION PROCESSOR AND PREVIEW METHOD

BACKGROUND OF THE INVENTION

1. Field of the Invention

The present invention relates to a program, an information processor and a preview method having a so-called preview function and the like for displaying a print image recognizable to a user, for example, prior to implement a print process.

2. Related Background Art

Conventionally, technology for obtaining a print image to display on a screen prior to printing has been proposed.

As an example of such technology, a technique of analyzing a print command sent to a printer (hereinafter occasionally referred to as "print apparatus") with a computer (information processor) brought into connection with the printer to generate a print image by spreading out on each CMYK plane with that computer, and a technique of transmitting a print command from a host computer for bringing a printer into printing to the printer so that, thereafter the host computer receives a print image produced inside the printer and implements display based on the received print image is generally known.

Here, in a print system using a computer on which Microsoft Windows® is mounted as an operating system (OS), since print data generated with an application program and the like are stored in an OS standard spool file thereof, an access to the print data stored in that spool file is not allowed freely. Therefore, in such a print system, at the time when the print data has actually started a print process, a previewer for displaying a print image is executed so that at the time when that print data is actually printed the printer driver for producing a print image and the previewer for displaying the print image operates harmoniously, and thereby the preview function is realized. See, for example, Japanese Patent Application Laid-Open No. 2003-167721 (US-2003-0103221).

However, the prior art as described above imparts following problems to be solved.

In an ink-jet printer, an object of which is miniaturization and low-cost performance, it is difficult to realize a function of generating a print image from a print command that the print apparatus has received to transmit it to a host computer being a superior apparatus. In addition, in an ink-jet printer, since print resolution gets high, the size of the print image generated by the print apparatus gets considerably large, it is not realistic to transmit it to the host computer.

In addition, in a print system using a computer on which Microsoft Windows® is mounted as an operating system (OS), a preview function has been provided as follows. At first, the print function of the OS prepares a queue for administrating a print unit (hereinafter referred to as "print job") to be stored in a spool file for each printer to store a plurality of print jobs. Normally only one unit is brought into a print state among print jobs stored in the queue, and the print job with the highest priority will be brought into a print state. In order to implement print process of the print job brought into a print state, the print function of the OS calls the printer driver and thereby generates a print image, generates from the print image a print command interpretable to the printer, and supplies the printer with the print command and thereby executes printing. In order to utilize this print system to realize a preview function, the timing should be subject to setting of instruction for preview display in the print job in the print state, and the printer driver starts up an application for implementing preview display so that the printer driver displays the image data generated for preview display onto the screen and thereby the preview function used to be realized.

Here, while the preview function is being executed with the said OS, the other print jobs will not be brought into a print state. Therefore, in the case where there is a print job in printing in the queue, since the preview function of the other print jobs cannot be executed, the user cannot take a look at the print image until at least the job in printing and a print job with the priority higher than the issued print job have been processed.

In addition, in case of using the said OS, at the time of executing a preview function in a print job in a print state, the other jobs will not be printed at least until the process of the job in execution of the preview function is over.

In addition, in case of using the said OS, since a plurality of users can issue print jobs at the same time, there is an disadvantage that, while a user is using the preview function, the other user cannot utilize the preview function. In addition, there is a disadvantage that, likewise, while a user is using the preview function, the other user happens to issue a print job in vain without being brought into printing.

SUMMARY OF THE INVENTION

The present invention was attained in view of the above described conventional problems, and an object hereof is to provide a print controlling apparatus as well as methods, a computer program, computer readable storage media, a preview apparatus as well as methods, a process method of print jobs, a printer driver as well as preview methods thereof which are capable of efficiently previewing display of high quality print image, adding a preview function to a print job process method and a printer driver of an OS, thereby maintaining affinity with a conventional printer driver and having simply configurations.

In order to attain the above described object, a computer readable program of the present invention is a computer readable program utilizing an operating system standard spooler for spooling intermediate data converted from print data supplied from an application, comprising:

a process module for implementing a print thread process and a preview thread process; and a preview module for executing preview based on a bit map produced based on the above described spooled intermediate data, wherein the preview thread process of the above described process module is started in accordance with commencement of a print process to start up the above described preview module, and the print thread process of the above described process module is started up in the case where there is any job which has already finished undergoing preview or any job which has not yet undergone preview settings.

In addition, the computer readable program of the present invention is a computer readable program utilizing an operating system standard spooler for spooling intermediate data converted from print data supplied from an application, comprising:

a process module for implementing a print thread process and a preview thread process; and a production module for producing a bit map based on the above described spooled intermediate data; and a preview module for executing preview based on a bit map produced by the above described production module, wherein the preview thread process of the above described process module is started in accordance with commencement of a print process to start up the above described preview module and notify the above described production module of commencement of preview, and the print thread process of the above described process module is started up in the case where there is any job which has already finished undergoing preview or any job which has not yet undergone preview settings.

In addition, the computer readable program of the present invention is a computer readable program utilizing a spooler of a system, comprising:

a user interface driver for implementing print settings of a print job issued by an application program;

a print processor for arranging print data of each page of the print page issued by the above described application program on a page-by-page bases under the state of page-description language;

a previewer for starting operation in accordance with the start of the above described print processor;

a printer graphic driver for generating image data to convert it into a print command interpretable to the printer; and a language monitor for supplying the printer with the above described print command, wherein, the above described spooler brings the above described print processor into operation in order to generate a print image for preview at the time when production of a print document data is started by the above described application program;

the above described print processor starts its operation with the above described spooler to start up the above described previewer in accordance with the driver property set corresponded with the print document data as well as to bring each page of the print data of the above described document into process to produce the print page data to supply it to the above described printer graphic driver;

the above described printer graphic driver stores the image data generated based on the above described supplied print page data into a print image file;

the above described previewer displays the image data stored in the above described print image file on a screen and thereby implements preview display;

the above described spooler brings the above described print processor into operation after finalization of the above described preview display in order to generate print image for printing;

the above described print processor starts its operation by the above described spooler and brings each page of the print data of the above described document into process in accordance with the driver property set corresponding with the print document data to produce the print page data to supply it to the above described printer graphic driver; and the above described printer graphic driver converts the image data generated based on the above described supplied print page data into a print command interpretable to the printer.

In addition, an information processor of the present invention comprises:

a spooler for producing a subthread for preview in accordance with commencement of a print process and calling a print processor; and a print processor for starting up a previewer after undergoing preview settings, and finalizing the preview thread after a request for print commencement, while before undergoing preview settings, finalizing the preview thread, wherein the above described spooler sets the preview state of the job to "already processed" in accordance with an event of finalization of preview thread;

the above described spooler produces a subthread for print in the case where there exits a job with the preview state being "already processed" and calls out the print processor;

the above described print processor executes print process of the job with the preview state being "already processed".

In addition, an information processor of the present invention is an information processor utilizing an operating system standard spooler for spooling intermediate data converted from print data supplied from an application, comprising:

a process unit for implementing a print thread process and a preview thread process; and a preview unit for executing preview based on a bit map produced based on the above described spooled intermediate data, wherein the preview thread process of the above described process unit is started in accordance with commencement of a print process to start up the above described previewer, and the print thread process of the above described process unit is started up in the case where there is any job which has already finished undergoing preview or any job which has not yet undergone preview settings.

In addition, an information processor of the present invention is an information processor utilizing an operating system standard spooler for spooling intermediate data converted from print data supplied from an application, comprising:

a process unit for implementing a print thread process and a preview thread process;

a production unit for producing a bit map based on the above described spooled intermediate data; and a preview unit for executing preview based on a bit map produced by the above described production unit, wherein the preview thread process of the above described process unit is started in accordance with commencement of a print process to start up the above described previewer and notify the above described production unit of commencement of preview, and the print thread process of the above described process unit is started up in the case where there is any job which has already finished undergoing preview or any job which has not yet undergone preview settings.

In addition, an information processor of the present invention is an information processor comprising a unit for temporarily storing intermediate data for output of document data in accordance with a print instruction of the document data, comprising:

an image data generation adjusting unit for controlling timing for bringing the above described temporarily stored intermediate data into image data generation;

an image data generation unit for generating image data based on the above described temporarily stored intermediate data;

a preview unit for, in the case where display of a print image of the above described document data is designated in the above described print instruction, issuing a request for image generation in accordance with that print instruction as well as displaying a preview screen displaying the print image of the above described document data based on the acquired information for obtained preview display; and a process controlling unit for controlling the above described image generation unit so as to generate the above described image data in accordance with issuance of the above described request for image generation as well as for controlling the above described preview unit so that preview display displaying the above described print image is implemented by notifying the above described preview unit of information for the above described preview display based on the generated image data, wherein, at the time of commencement of storing intermediate data for an output of the above described document data, the above described image data generation adjusting unit makes the above described process controlling unit generate image data for preview display from the intermediate data for an output of the above described document data, and the above described image data generation adjusting unit makes the above described process controlling unit generate image data for print from the intermediate data for an output of the above described document data and implement a print process subject to the process of the above described process controlling unit.

In addition, a preview method of the present invention is a preview method utilizing a spooler for producing a subthread for preview in accordance with commencement of a print process and calling out a print processor, and a print processor for starting up a previewer after undergoing preview settings, and finalizing the preview thread after a request for print commencement, while before undergoing preview settings, finalizing the preview thread, wherein the above described spooler sets the preview state of the job to "already processed" in accordance with an event of finalization of preview thread;

the above described spooler produces a subthread for print in the case where there exits a job with the preview state being "already processed" and calls out the print processor; and the above described print processor executes print process of the job with the preview state being "already processed".

In addition, a preview method of the present invention is a preview method utilizing an operating system standard spooler for spooling intermediate data converted from print data supplied from an application;

process means for implementing a print thread process and a preview thread process; and preview means for executing preview based on a bit map produced based on the above described spooled intermediate data, wherein the preview thread process of the above described process means is started in accordance with commencement of a print process to start up the above described previewer, and the print thread process of the above described process means is started up in the case where there is any job which has already finished undergoing preview or any job which has not yet undergone preview settings.

In addition, a preview method of the present invention is a preview method utilizing an operating system standard spooler for spooling intermediate data converted from print data supplied from an application; process means for implementing a print thread process and a preview thread process; production means for producing a bit map based on the above described spooled intermediate data; and preview means for executing preview based on a bit map produced by the above described production means, wherein the preview thread process of the above described process means is started in accordance with commencement of a print process to start up the above described previewer and notify the above described production means of commencement of preview, and the print thread process of the above described process means is started up in the case where there is any job which has already finished undergoing preview or any job which has not yet undergone preview settings.

BRIEF DESCRIPTION OF THE DRAWINGS

FIG. 9 is a table of corresponding states in order to determine state display of print jobs in the present embodiment;

FIG. 13 is a conceptional diagram of an interface that the print processor of the present embodiment comprises;

FIG. 15 exemplifies an administration table of a preview files for reference related to the present embodiment;

DETAILED DESCRIPTION OF THE PREFERRED EMBODIMENT

An embodiment of a printing system related to the present invention will be described in detail with reference to the drawings.

Here, in the following description, the term "document" will include the one that includes something graphical such as a drawing, a table or a bit map image and the like in addition to texts, as well as the one consisting of only something graphical.

Figure 1:
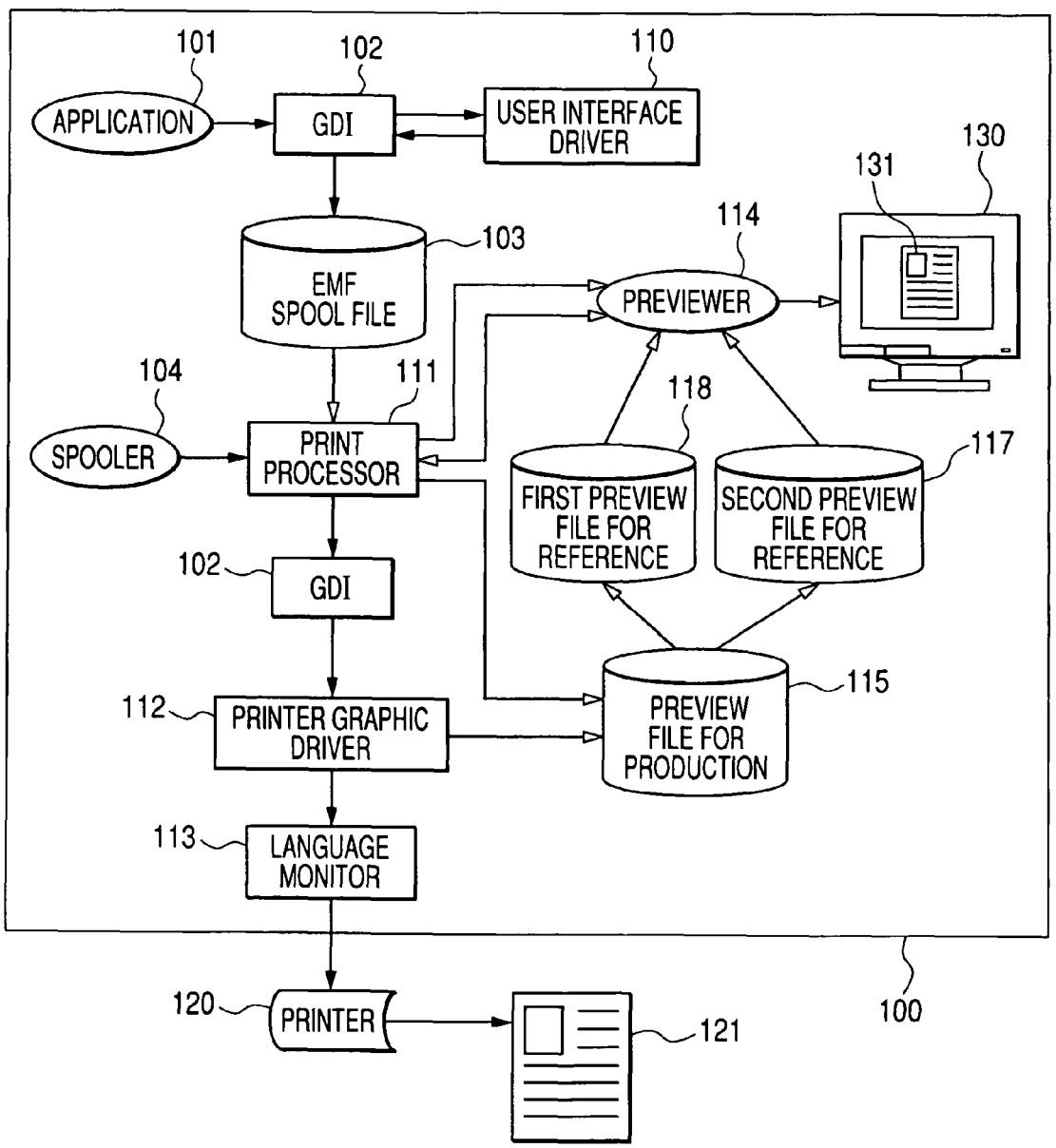
FIG. 1 is a block diagram describing a data flow for implementing printing as well as print previewing of the present embodiment.

FIG. 1 is a block diagram describing a data flow for implementing printing as well as print previewing with a printing system related to an embodiment of the present invention.

As shown in the above described drawing, the print system related to the present embodiment is configured by a host computer (computer) 100 as a print controlling apparatus and a printer 120, and in the computer 100, Windows® produced by Microsoft Corporation, for example, works as an operating system (OS).

This computer 100 comprises, internally, as modules (functional units) to be implemented:

a previewer 114 for displaying a print image on a display 130;

a user interface driver 110 for realizing print setting operation by a user;

a printing processor 111 capable of functioning to start the previewer 114, and for implementing print-page processing;

a spooler 104 for administrating print processing as well as preview processing of a print job;

a printer graphic driver 112 for producing/processing a print image to be printed by the printer 120 and for implementing conversion into a print command interpretable to the printer; and a language monitor 113 for supplying the printer with the print command produced by the printer graphic driver 112.

The above described printer graphic driver 112 not only comprises functions for transmitting the produced printing data to the printer 120 via the language monitor 113, but also comprises functions for storing it as a file under a designated file name.

In addition, the above described printer graphic driver 112 is capable of producing the print data to be produced in a bit map form and also capable of producing in any language that the printer 7 can process. Preview files 115, 116 and 117 being image files for implementing preview display are produced temporarily.

Figure 17:
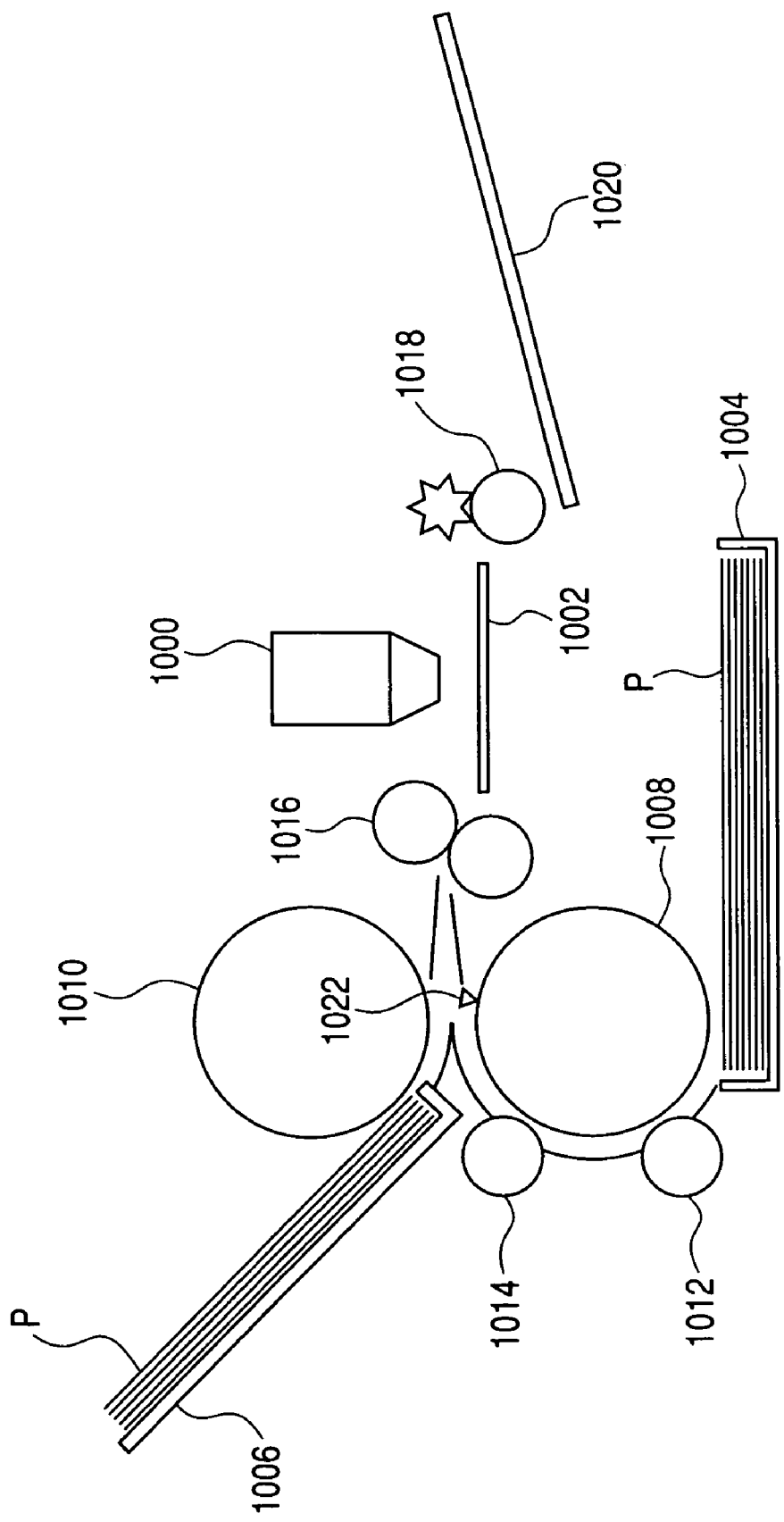
FIG. 17 is a schematic diagram of an ink jet printer.

As concerns an example of a hardware configuration of a print system for realizing a data flow shown in FIG. 1, description will be made later with reference to FIG. 2 and FIG. 17.

The print system shown in FIG. 1 temporarily stores print data of a document produced with an application (application program) 101 in an upper ranked apparatus 100 such as a personal computer and the like into an EMF spool file 103 via GDI 102 as intermediate print data (intermediate data for outputting). The spooler 104 comprises a function for calling out the printing processor 111 in order to convert the temporarily stored intermediate data into bit map data for previewing or into a print command for printing. And these converted bit map data are configured to be supplied to the printer 120 from the host computer 100 and to be outputted onto a recording stock paper and the like as a printed document 121 in the printer 120.

In the present embodiment, the user interface driver 110, the printing processor 111, the printer graphic driver 112, the language monitor 113 and the previewer 114 are to be provided by a printer driver program supplied by another party (a printer manufacturer in the present embodiment) different from an operating system supplier. In the following descriptions, a group of programs including the user interface driver 110, the previewer 114, the printing processor 111, the printer graphic driver 112 and the language monitor 113 may be collectively referred to as "printer driver program".

The GDI (graphic device interface) 102 is provided as a graphic engine of Windows® being an operating system. That is, the GDI 102 is a program module for implementing graphics processing such as screen displaying or printing and the like in the Windows®, which receives a drawing command from the application 101, and the drawing command undergoes conversion into a data form interpretable to the device driver such as the above described printer driver program in the GDI 102 and then is transmitted to the device driver.

In addition, the EMF is the abbreviation of Enhanced Meta File and is a logical storing form of the drawing data in the Windows® being the OS and print data of a document are stored in the EMF form into the EMF spool file 103 shown in FIG. 1.

In addition, the spooler 104 is a process in the Windows® being an operating system for calling out the printer driver in order to execute the printing process of the produced EMF spool file 103, and the printing system of the present embodiment has undergone expansion of function of an OS standard spooler for preview display 131 of the above described document onto the display 130.

The user interface driver 110 provides general setting functions for setting sizes of recording stock paper to be used for printing or printing directions and other attributes, and in addition, moreover the user interface driver 110 related to the present embodiment further comprises a print setting processor for providing a user with previewing setting functions for determining whether or not to display the preview display (131) showing the print image of a document prior to the printing process at the time of execution of printing onto the display apparatus 130 as exemplified in FIG. 1. As follows in the present embodiment, the value which has been set via the user interface driver 110 will be referred to as "print setting".

In the present embodiment, use of functions provided by the print setting processor through the user interface screen displayed by user interface driver 110 in the display apparatus 130 enables a user to set print setting including employment or unemployment of preview display. For example, the preview setting is realized as a flag showing either "display preview" or "not display preview". In the following descriptions, the state with setting as to "display preview" in the preview setting will be simply referred to as "undergo preview setting".

In addition, such print setting is stored into a file apparatus such as magnetic disk and the like as a part of the EMF spool file 103, and is referred by the user interface driver 110, printing processor 111 and the like.

(Example of Print Setting Dialogue by User Interface Driver)

Figure 3:
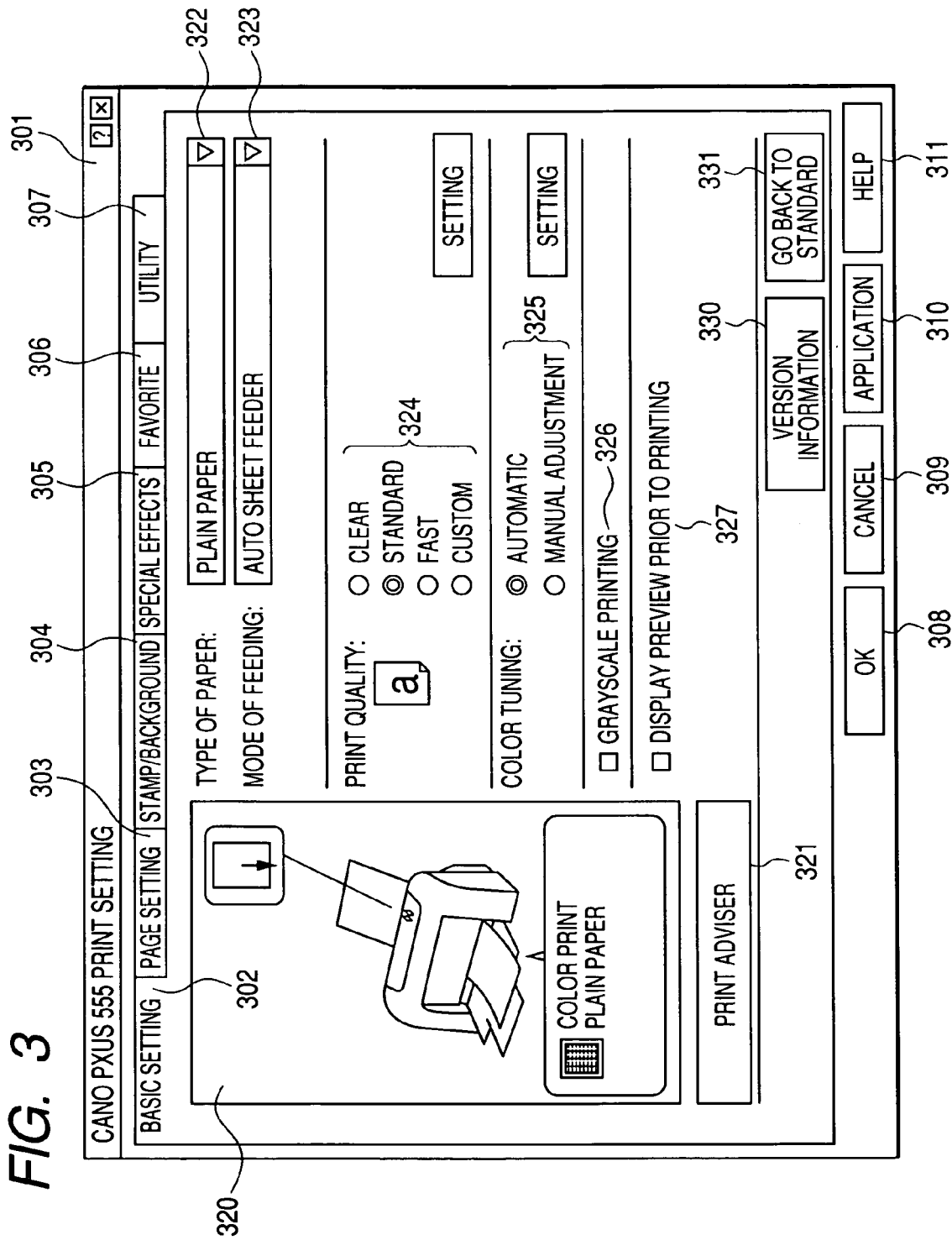
FIG. 3 exemplifies a print setting dialogue provided by a user interface driver of the present embodiment.

FIG. 3 exemplifies a print setting dialogue provided by a) user interface driver of an embodiment of the present invention.

In FIG. 3, a print setting dialogue 301 is configured by display regions 302 to 331. There are considerably many setting items to be displayed for print setting, and therefore tab sheets are customarily used to sort the setting items according to contents to give rise to a sight-friendly configuration. The present embodiment uses a plurality of tab sheets as well.

A basic setting tab 302 displays contents on basics of printing. Details on this tab will be described later.

The page setting tab 303 displays contents on various page settings such as sheet sizes of printing stock paper, printing directions (directions of printing), a printing layout (N-up) and the like. Here, N-up means to implement layout of documents in the amount of N pages (N pages and more (N-up)) on one sheet of paper and to print it. A stamp/background tab 304 displays a screen for selecting patterns to be added at the time of printing such as a stamp function of overlapping characters onto the print document and background function of overlapping images and the like. A special effect tab 305 displays a screen for selecting functions to be used in case of giving an image special effects such as various kinds of image smoothing, sepia tone and the like. A favorite tab 306 displays a screen for selecting functions of storing and calling out print setting frequently used. A utility tab 307 displays a screen for selecting functions of adjustments, cleaning and the like of the head.

FIG. 3 exemplifies a display in case that the basic setting tab 302 has been selected.

In a simple display region 320 of the basic setting tab 302, image information set not only in a form of literal information but also in a visually attractive form is displayed. When a print adviser 321 is selected, a subdialogue comprising a function to lead to the optimum print setting stepwise based on objects for printing is displayed in order to make a user input print setting more appropriately.

A sheet type selecting section 322 displays and enables a user to select sheet types. The sheet type selecting section 322, which is a drop down menu, normally displays the sheet types selected and clicking there gives rise to a list of sheet types available for selection to be displayed. Sheet types available for selection are stock paper printable with the printer 120, and include, for example, gloss paper, coated paper, photo print paper, postcard and the like in addition to the shown plain paper.

A sheet feeding method selecting section 323 displays a sheet feeding method how the main body of the printer 120 brings the print stock paper into sheet feeding, and enables a user to select a sheet feeding method. With the sheet feeding method selecting section 323, a user can select, for example, a sheet feeding tray (auto sheet feeder) and a sheet feeding cassette being an automatic sheet feeding port.

A print quality selecting section 324 comprises setting items to make a user set quality of printing and is configured by radio buttons. Here, setting items consist of "clear", "standard", "fast" and "custom". Color adjusting section 325 comprises setting items to make a user adjust print colors and is configured by radio buttons. Here, setting items consist of "automatic" and "manual adjustment". A gray scale setting section 326 is a check box in order to make a print result in a gray scale even if a document for printing is in color. A preview setting section 327 is a check box in order to preview a print image prior to printing.

A version information button 330 is a button for displaying a subdialogue showing the version of the driver which displays the present print setting dialogue 301. When standard setting section 331 is pushed, various settings of the basic setting tab 302 get back to the standard (factory settings).

The user selects respective setting items appropriately and then pushes the OK button 308 down so as to close the print setting dialogue 301 and can cause printing to reflect the selected print settings. On the other hand, pushing down a cancel button 309, the print setting dialogue 301 is closed so as to abandon the contents of the selected setting items which printing will not reflect. An application button 310 can cause printing to reflect the selected print settings with the print setting dialogue 301 remaining open. A help button 311 can cause a description text on respective setting items of the basic setting tab 302 to be displayed in another window.

(Example of Preview Window by Previewer)

Figure 4:
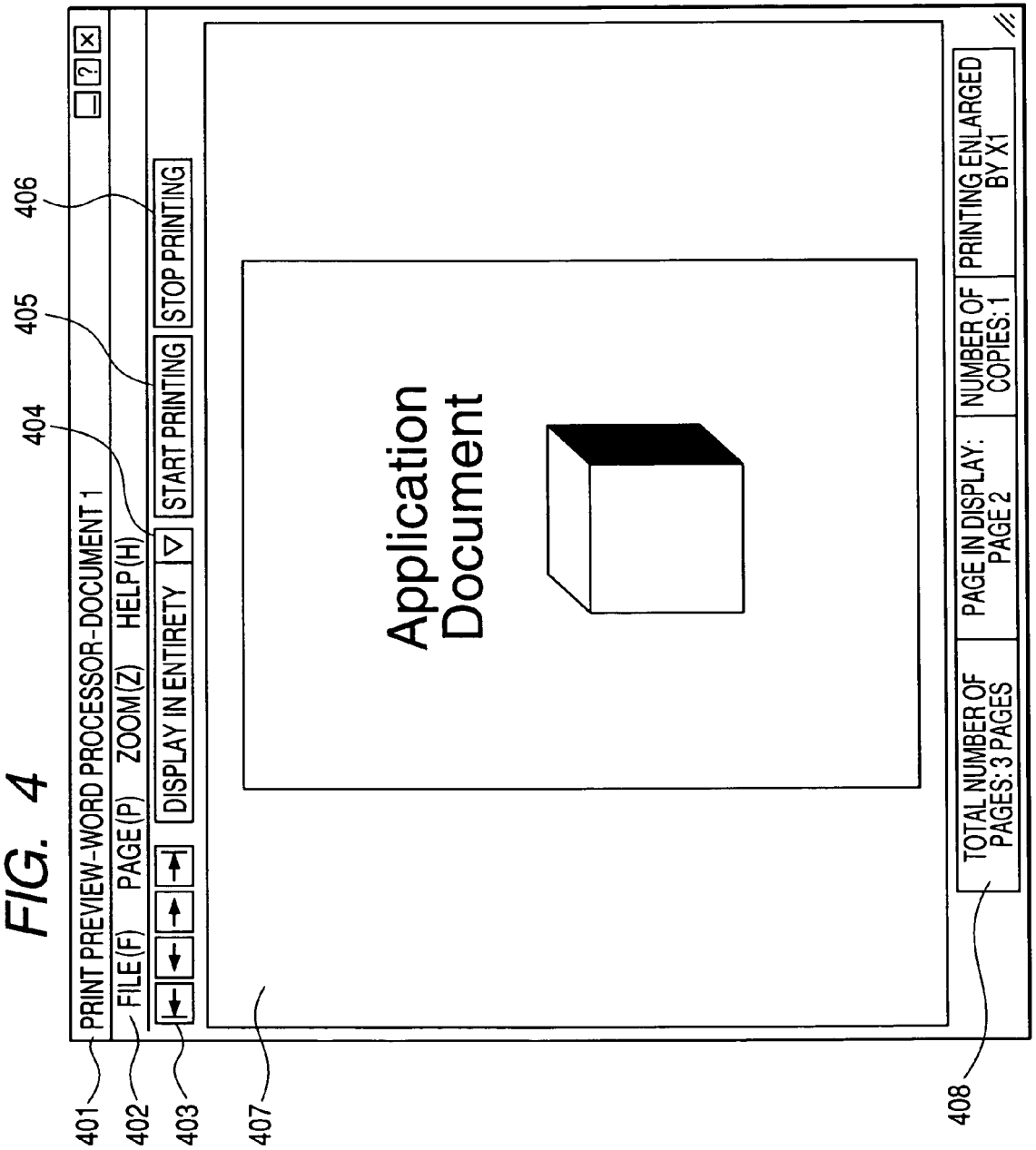
FIG. 4 exemplifies a display screen (preview window) provided by a previewer of the present embodiment.

FIG. 4 exemplifies a display screen (preview window) provided by a previewer of the present embodiment. Reference numeral 401 denotes a print preview window, and comprises a display region for displaying a preview image and print settings of a print job and the like together with input means in order for a user to change the method of displaying the preview image.

Reference numeral 402 denotes a menu bar of the print preview window 401, and enables a user to select instructions to the previewer, such as display switching and the like, in a form of a menu. A region where user operation sections 403 to 406 are prepared is a tool bar, and enables a user to push down the tool bar 403 without using the menu bar 402 so as to switch the preview page easily. Reference numeral 403 denotes a set of four buttons which are page switching buttons, and can switch the preview display to the top page, the preceding page, the next page and the last page. Reference numeral 404 denotes a dropdown list for changing display sizes of the preview image, and is capable of selecting display across the screen, 100% display, 200% display and the like, and the previewer interprets the display size change by a user to attain bit map image for previewing with appropriate resolution and thereby switches display. Reference numeral 405 denotes a print start button and, pushing this button down, the preview can be finished so as to enable the previewed print job to get ready for print processing. Reference numeral 406 denotes a print cancel button, and pushing this button down, previewing is finished and print processing of the previewed print job can be cancelled. Reference numeral 407 denotes a preview display region, that displays the print stock paper produced as a bit map for previewing as well as a visible image which will be formed on the print stock paper. Reference numeral 408 denotes a display region for displaying setting values of representative setting items on print settings of a print job which is undergoing execution of a preview function, and the present drawing exemplifies the case where the total number of pages of the document is 3 pages, the page number which is being displayed for previewing is the page 2, the number of copies set at the print setting is one, and printing enlarged by ×1 is set.

In addition, in the present embodiment, the display screen exemplified in FIG. 4 is displayed in correspondence with instruction to start printing under the state subject to preview settings in the application. The page to become an object for the preview display at first is, for example, the first page when a document is actually printed according to the settings of print conditions, and the page will always be numbered "1". In addition, for example, in the case where a reverse order printing is set as a print condition, the document is printed from the last page, and therefore the preview screen for the page number 1 corresponds with the last page of the document.

Here, the example shown in FIG. 4 does not allow direct designation of a page number, but the process may be configured by providing an input box to make a page number be inputted so as to display for preview the page of the page number inputted there.

(Printer Queue)

Figure 5:
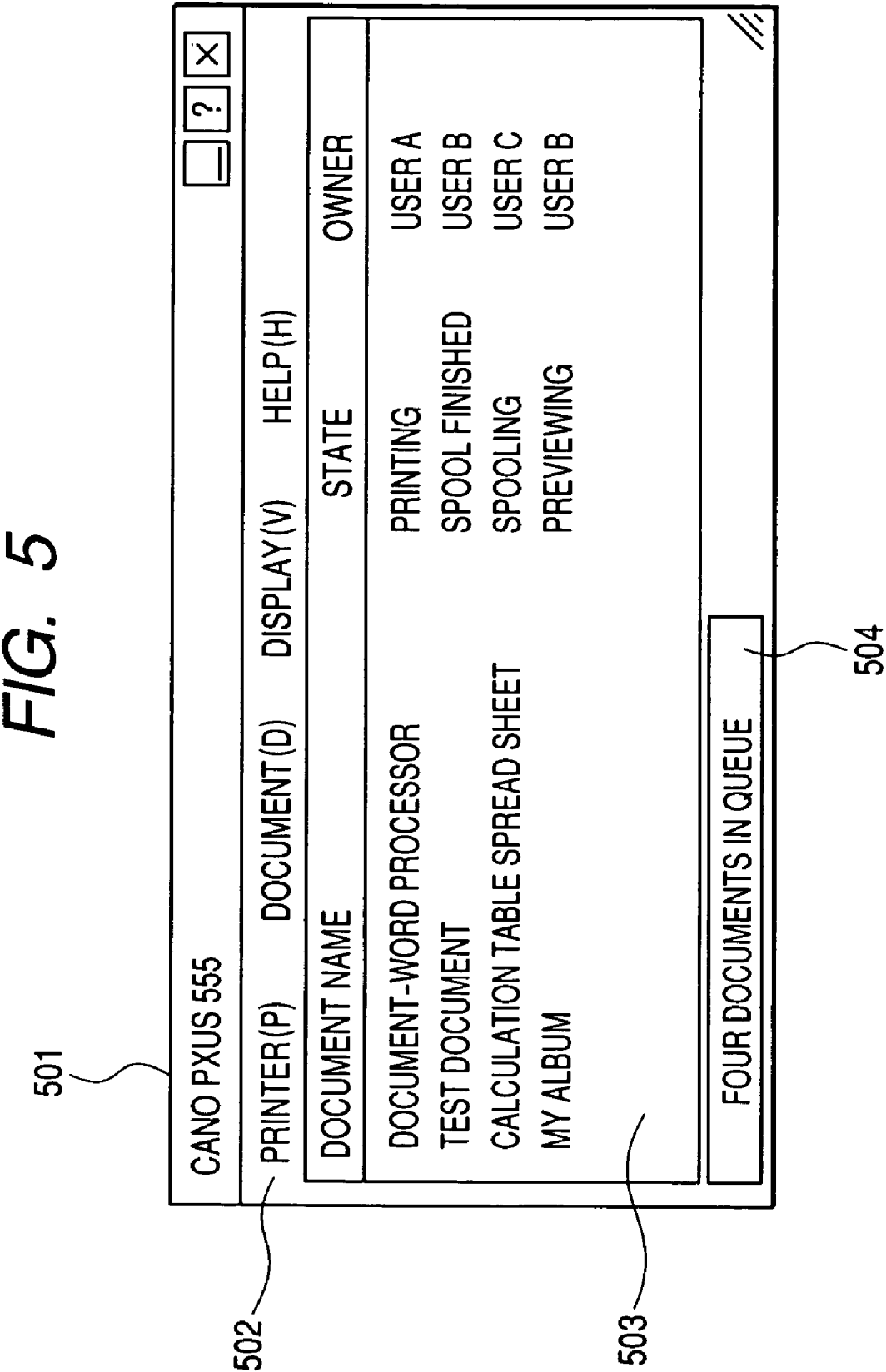
FIG. 5 exemplifies a queue window in the present embodiment.
Figure 6B:
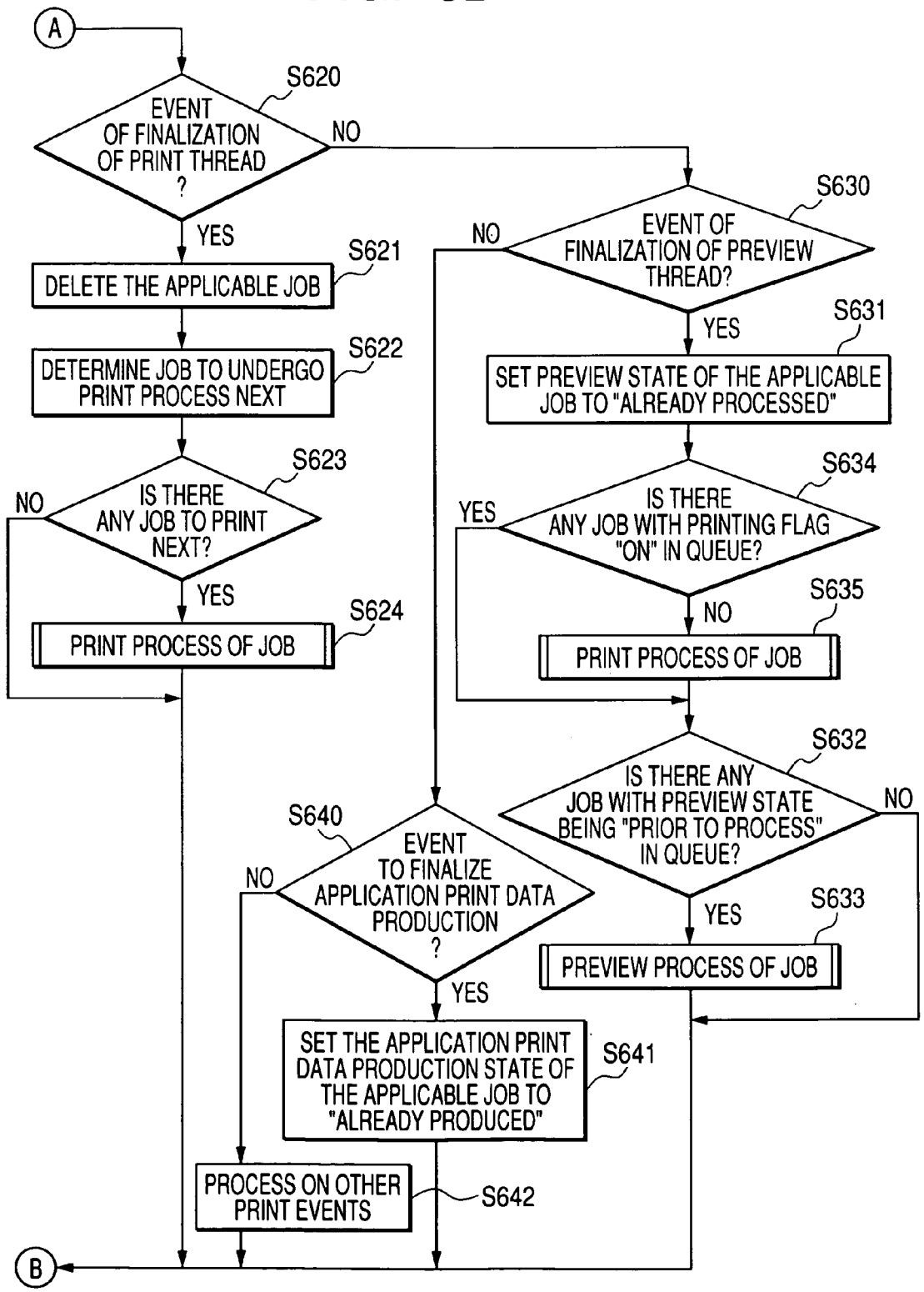
FIG. 6 is comprised of FIGS. 6A and 6B showing flow charts on preview processing as well as print processing of a spooler in the present embodiment.

Normally, since the number of documents that a single printer can print at the same time is one, an operating system has a logical queue for administrating a plurality of print jobs on each printer (hereafter to be referred to as printer queue or, just, queue). FIG. 5 exemplifies a queue window that a user can confirm the state of a pint job at least inside the printer queue visually, and includes a print job under execution of preview function in the present embodiment. The print job with the state of print job being "previewing" is the print job under execution of the preview function.

(Process of Print Job of Spooler)

FIGS. 6A and 6B to FIG. 8 show flow charts focused to the occasion of implementation of a print process after a spooler in the present embodiment has brought a print job in the midst of printer queue into preview processing. Since a standard spooler of the Windows® does not provide a preview function, the present embodiment has been provided with a preview function additionally, but the other print functions are likewise those of a standard spooler. In addition, in the present embodiment, a standard interface of the print processor has undergone extension for previewing. Accordingly, in the present embodiment, focusing attention on the preview function, the spooler and the print processor will be described mainly. The spooler retains a table for controlling the internal state of each print job as exemplified in FIG. 9, and, as exemplified in the queue window in FIG. 5, is used to tell a user the state of a print job in a readily understandable fashion. The present embodiment will deal with three kinds of states, that is, a printing flag, an application print data producing state and a preview sate, and use a queue window to determine the print state display to show to a user.

A spooler is a process to provide a print function of an OS, and therefore, normally, will not finalize its operation but continue to process the queue process loop shown in the step S601 and the step S651. In the step S602, an event on a print job is waited. An event on a print job refers to, for example, a start or an end of a print process or a temporary halt or an end of an actual print process, all implemented by an application. Receipt of an event moves the step to the step S610 so as to determine whether or not it is a print data forming start event of an application and, in case of a print data forming start event of the application, moves to the step S611 to proceed with processing of a new print job. If the step S610 is not a print data forming start event of the application, the step moves to step S620.

The step S611 sets the printing flag into "Off" and sets the application print data producing state into producing that have been newly produced and notified in the event. Subsequently, the step S612 determines whether or not a print processor for processing a print job accommodates a preview function of the present embodiment, and in case of non-corresponding print processor, the step moves to the step S615 and, in case of a corresponding print processor, moves to the step S613. Methods of determining whether or not a print processor corresponds with the preview function of the present embodiment will be described later with reference to FIG. 7. In the step S615 the print processor does not correspond with the preview function, the preview state of the print job is set to "already processed". Subsequently, the step S616 determines whether or not there is any job with the printing flag being "On" in the jobs inside the queue, and if there is any job with the printing flag being "On", the step moves to the step S650, and if there is no job with the printing flag being "On", the step moves to the step S617 to implement print process of the print job notified in the event and subsequently moves to the step S650. Here, the present embodiment is preconditioned that a print job with the printing flag being "On" during a queue, that is, in printing, is one at the maximum, but in the case where a printer pool functions to allocate a plurality of printers for a queue, the number of printers allocated may be the maximum number of the printing flags being simultaneously "On". In addition, the print processing of the print job in the step S617 will be described later with reference to FIG. 8.

In the case where the print processor does not correspond with a preview function of the present embodiment in the step S612, the step S613 determines whether or not the number of print jobs among print jobs in the queue with the preview states being processing is less than the maximum preview number allowed by the system, and in case of the number less than the maximum preview number the step moves to the step S614 or in case of the maximum preview number, to the step S618. Here, the maximum preview number allowed by the system refers to the maximum number of preview images permitted to be produced and displayed at the same time and setting at least the number of users who are allowed to use the host computer 100 in FIG. 1 will enable all the users to utilize the preview function in respective single print jobs simultaneously. In addition, since this maximum preview number depends on process performance of the host computer 100, it goes without saying that the spooler may determine the process performance of the host computer 100 to implement settings automatically or a user may be assigned to implement settings. In the case where the step S613 has determined the number to be less than the maximum preview number, the step goes forward to the step S614 to undergo a preview process of the print job (in FIG. 7) and moves to the step S650. On the other hand, in case of the maximum preview number, in the step S618 the preview state of the print job notified in the print event is set to a "prior to process" and the step moves to the step S650. In addition, a preview processing of a print job in the step S614 will be described later.

The step S620 determines whether or not an event of finalization of a print thread has taken place, and in case of an event of finalization of a print thread, the step moves to the step S621 and in case of the other events, the step moves to the step S630. The step S621 implements deletion process of a print job notified in the event, and the step S622 determines a print job to undergo the print process next among print jobs in the queue. Here a print job feasible to undergo the print process next refers to a print job with at least the preview state of the print job being already processed and the printing flag being "Off". In the case where there are a plurality of print jobs fulfilling this condition, it goes without saying that a print job to undergo the print process next may be determined according to priorities, starting date and time of production of print jobs. In addition, details of the process of the step S622 will be described later with reference to FIG. 10. The step S623 determines whether or not there is any print job to undergo the print process next, and in the case where there is none, the step moves to the step S650, and in the case where there is any, the step moves to the step S624 to implement a print process of the print job (in FIG. 8) and thereafter moves to the step S650.

The step S630 determines whether or not the event in receipt is an event of finalization of a preview thread, and in case of the event of finalization of a preview thread, the step moves to the step 631 while in case of different event, the step moves to the step S640. In the step S631, the preview state of the print job notified in the event is set to "already processed". Subsequently, the step S634 determines whether or not there is any job with the printing flag being "On" in the jobs inside the queue, and if there is any job with the printing flag being "On", the step moves to the step S632, and if there is no job with the printing flag being "On", the step moves to the step S635 to implement print process of the print job (in FIG. 8) notified in the event and subsequently moves to the step S632. Subsequently, the step S632 determines whether or not there is any job with the preview state in "prior to process" among the print jobs in the queue, and if there is not any, the step moves to the step S650, but if there is any, in the step 633 the preview process of the print job (in FIG. 7) is implemented and the step moves to the step S650.

The step S640 determines whether or not the event in receipt is an event of finalization of the print data production of an application, and in case of the event of finalization of an event of finalization of the print data production of an application, the step moves to the step S641 to set the application print data producing state of the print job notified in the event to "already produced" and thereafter the step moves to the step S650. On the other hand, in the case where the step S640 determines that it is not an event of finalization of the print data production of an application, the step moves to the step S642 to implement processes of the other print events and thereafter the step moves to the step S650. Here the other print events refer to, for example, a temporary halt or an event of deletion of a print job and the like.

The step S650 renews display of the state of respective print jobs of queue window exemplified in FIG. 5. Here, display of the state of respective print jobs is determined based on the printing flag of the print job, the application print data producing state and the preview state. FIG. 9 is a table of corresponding states in order to determine state display of print jobs. For example, with the printing flag being "Off", with the application print data producing state being "already produced" and with the preview state being in processing, state display of the print job will be turned to previewing. Here, it is characteristic that the printing flag is capable of becoming "On", that is, only the print job in which the preview process has been finalized undergoes an actual print process, only when the preview state in FIG. 9 is already processed.

The print job of the queue is processed by repeating the loop of the above described steps S601 to S651.

Figure 7:
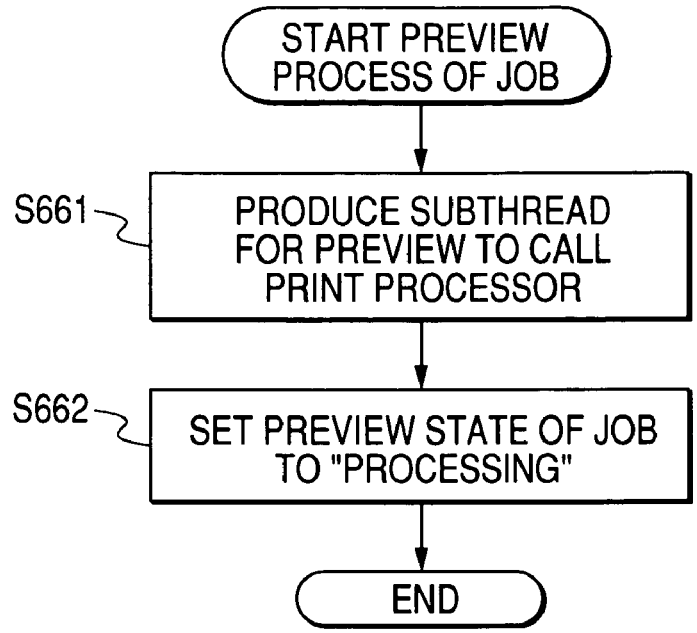
FIG. 7 is a flow chart on preview processing of a spooler in the present embodiment.

FIG. 7 shows a flow chart of the preview process of a print job being a sub-routine of the step S633. In the step S661, a subthread to cause the print processor to implement preview process is produced and the print processor is called out via an interface for preview that the print processor corresponding with the preview function has. The process of print processor called out will be described later with reference to FIGS. 12A and 12B. Subsequently, the step S662 sets the preview state of the print job to undergo preview process to processing and thereafter comes to an end. The interface that the print processor has will be described with reference to FIG. 13.

Figure 8:
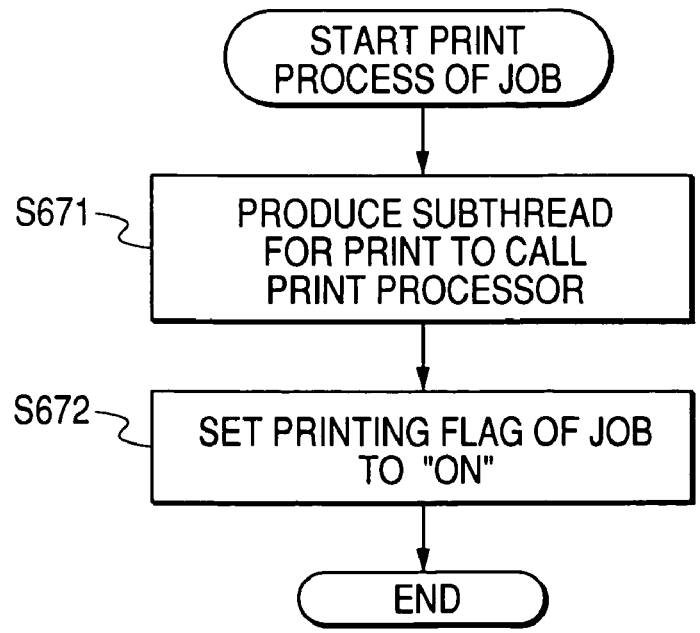
FIG. 8 is a flow chart on print processing of a spooler in the present embodiment.

FIG. 8 shows a flow chart of print process of a print job being a subroutine of the steps S617 and S624. In the step S671, a subthread to cause the print processor to implement a print process is produced and the print processor is called out via an interface for printing that the print processor has. The process of print processor called out will be described later with reference to FIG. 11. Subsequently, the step S672 sets the printing flag of the print job to undergo print process to "On" and thereafter comes to an end.

Figure 10:
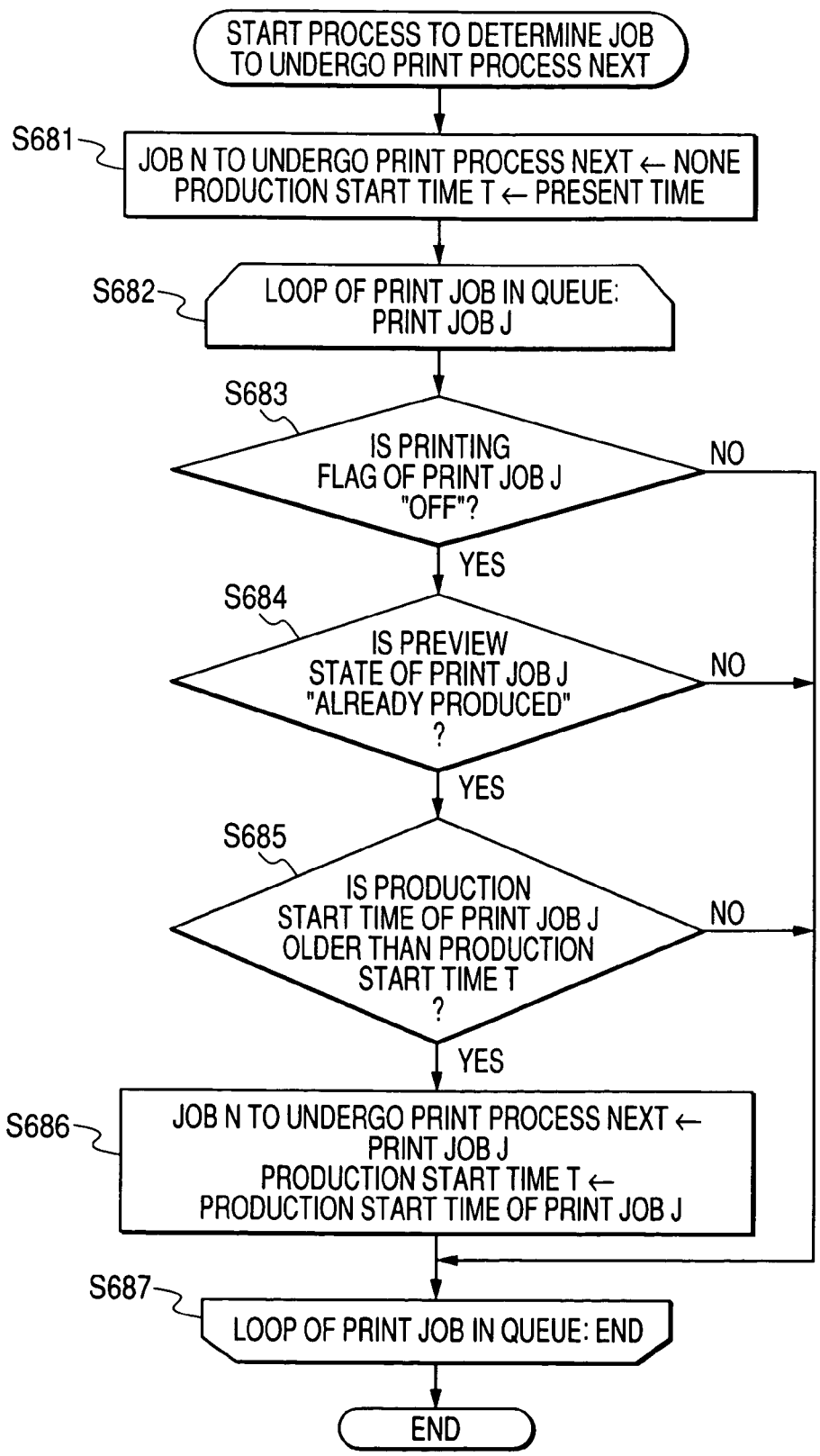
FIG. 10 is a flow chart on a process for determining a job for print processing of the spooler of the present embodiment.

FIG. 10 exemplifies a flow chart of a process to determine a print job to undergo a print process next among print jobs in the queue of the step S622. As shown in FIG. 9, it is necessary that a printable job has already undergone processing on the preview state and the printing flag is "Off". In the case where there are a plurality of print jobs fulfilling this condition, the print process may be implemented well starting from a print job under further conditions, for example, with the oldest print job production starting time.

At first, the step S681 implements initialization process. As initial values, "none" is stored as the job "N" to undergo a print process next and the present time as the print job production starting time T. The steps S682 to S686 are a loop for processing all of print jobs in the printer queue, and a print job for processing is indicated as a print job J. The step S683 determines whether or not the printing flag of a print job J is "Off", and in case of not "Off", the step moves to the step S687 to implement the next print job while, in case of "Off", the step moves to the step S684. The step S684 determines whether or not the preview state of the print job J is already processed, and in case of not already processed, the step moves to the step S687 to implement the next print job, and in case of already processed, the step moves to the step S685. The step S685 judges whether or not the print job production starting time of the print job J is older compared with the production starting time T, and if not older, the step moves to the step S687 to implement the next print job, and if older, the step moves to the step S686. The step S686 sets the job N to undergo print process next to the print job J, and stores the print job production starting time of the print job J for the production starting time T. Thus implementing search process of the print job with the oldest starting time enables to determine the print job to undergo the print process next in the printer queue.

As described so far, immediately after production of a print job has started, a subthread for preview is produced to call out the print processor, and thereby in each print job, preview process starts at once. In addition, until a preview process is completed, a print process will not be executed, and therefore, even if production staring time for a print job is late, a print process can be implemented earlier than a print job with preview process thereof being not yet processed or being in processing if the preview process is already processed. This is particularly effective in the case where jobs having been produced by a plurality of users simultaneously exist in a printer queue, and at the time when a user is executing the preview function, in the case where another user produces a print job not yet undergoing preview setting of a print job, it will be possible to undergo print process in advance while the precedingly produced job in previewing is postponed so that a printer can be utilized efficiently without any loss.

(Process of Print Processor)

FIG. 13 shows a conceptional diagram of an interface that a print processor with Windows® standard specifications has and the print processor of the present embodiment has respectively. For the print processor of the present embodiment, a preview function has been added to the print processor with Windows® standard specifications. That is, an interface to implement a print process is ready for the print processor with Windows® standard specifications but an interface for preview does not exist, and therefore the print processor of the present embodiment is provided with an interface for preview additionally. The interface for printing is Print DocumentOnPrintProcessor ( ) which is called out from the spooler at the time of print process. The interface added to Windows® standard specifications in the present embodiment is PreviewDocumentOnPrintProcessor ( ) which is called out from the spooler at the time of preview process. The spooler may well check whether or not the print processor related to the print job has an interface for preview in order to determine whether it is in accordance with the Windows® standard specifications or has a preview function in the present embodiment. In addition, in the interface for preview in the present embodiment, call ready printing functions of the OS in an interface for printing are all made utilizable. Thereby, the print processor lays out print data from the EMF spool file 103 in FIG. 1 in the interface for preview to supply it to the printer graphic driver, the printer graphic driver can produce image data from the laid-out print data to store images for preview into a file as bit map, and a previewer can display the produced image for preview onto a screen.

Figure 11:
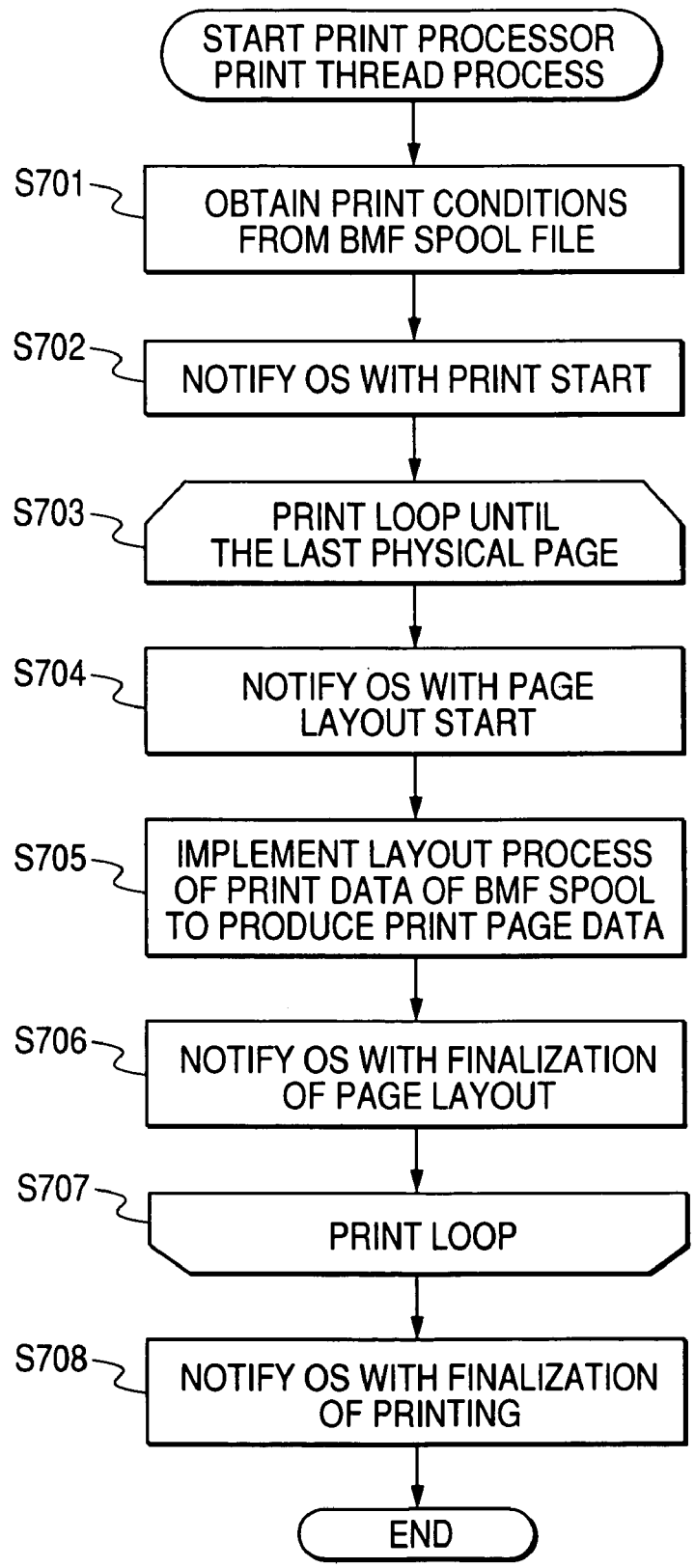
FIG. 11 is a flow chart on a process for printing of the print processor in the present embodiment.

Next, with reference to the flow charts of a print processor shown in FIGS. 11, 12A and 12B, preview process as well as print page process to be realized by the print processor related to the present embodiment will be described. The print processor is called out from a spooler in accordance with an application's starting print process of a document for print, and starts procedure shown in FIGS. 12A and 12B. In addition, print processor is called out from a spooler for a print job selected based on priority and the like from the print jobs already gone through preview process, and starts procedure shown in FIG. 11. That is, the print page process by the print processor in FIGS. 11, 12A and 12B is implemented on a print-job by print-job bases.

Figure 12B:
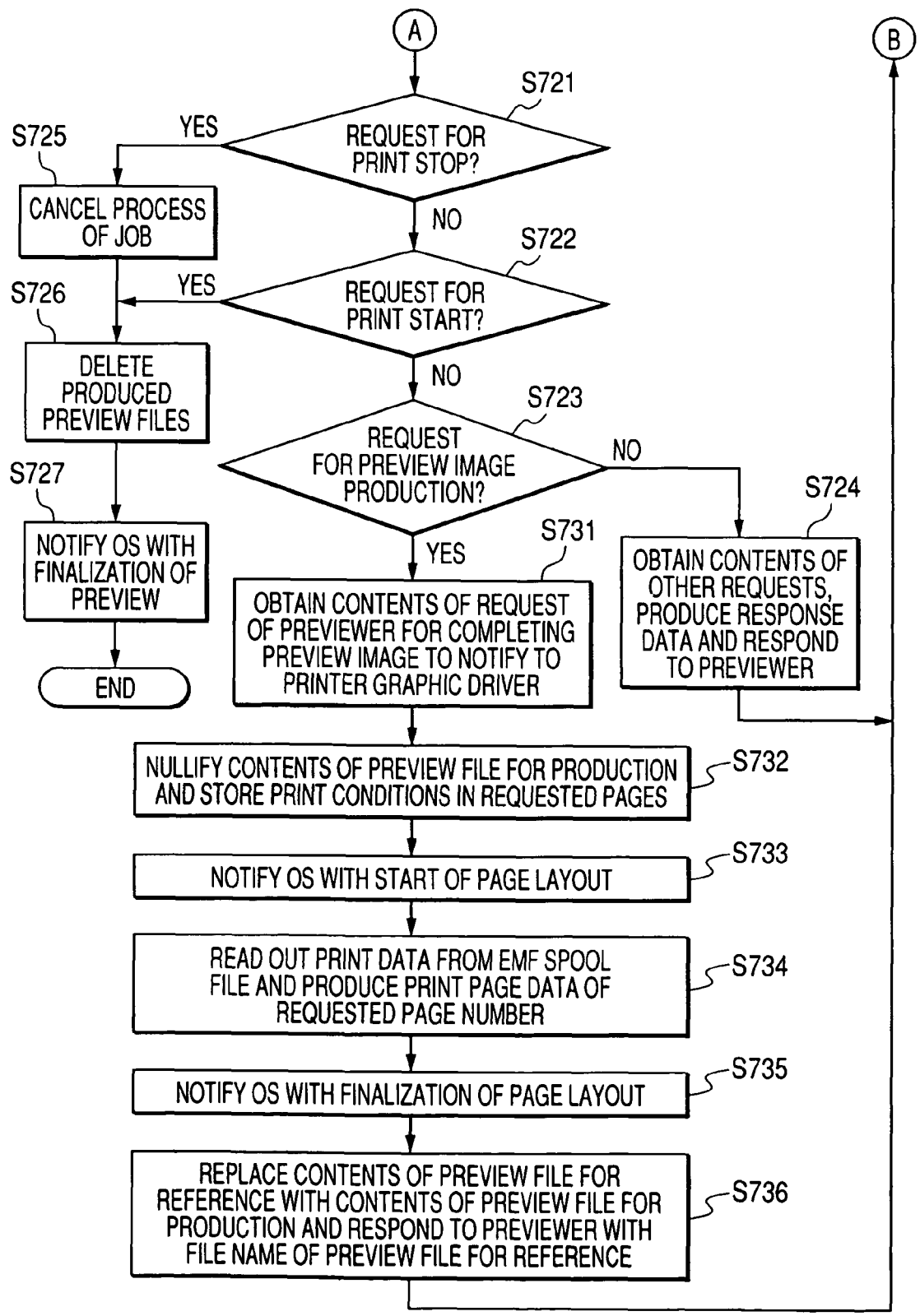
FIG. 12 is comprised of FIGS. 12A and 12B showing flow charts on preview processing of the print processor in the present embodiment.

FIGS. 12A and 12B show flow charts at the time when the interface for preview of the print processor is called out by the spooler (the step S661). The step S711 determines whether or not the preview setting is set to "ON" for the print setting of the print job, and if "ON", the step moves to the step S712 and if not "ON", the step immediately comes to an end. Here, at the time when the print processor finalizes the processing, an end event of the thread is notified to the spooler, then the spooler determines "YES" in determination of an end event of the preview thread of the step S630, to proceed with processing to the step 631. The step S712 and the immediately subsequent step S713 start up the previewer for displaying a preview screen and produce the preview files for production in order to store the preview image as well as its print conditions with the contents having been all cleared, and notifies the printer graphic driver of the start of preview process together with the file name of the preview for production file. The process of the started previewer will be described later with reference to FIG. 14. Subsequently, the step S714 waits for a request from the previewer, and if there is any request, the step S715 obtains the request of the previewer. Here, a request is realizable as a message in a predetermined form for communication between processes.

Subsequently, the step S716 determines the type of the request obtained from the previewer, and if it is a request for preview initialization, the step moves to the step S717 to determine the initialization process while, if not a request for preview initialization, the step moves to the step S721. The step S717 determines whether or not the initialization process has already been implemented, and if the initialization process has already been completed, the step moves to the step S714 to wait for a request from the previewer 8, and if the initialization process has not been completed, the step moves to the step S718 to implement the initialization process. The step S718 obtains the unit number of preview file for reference to be used based on the requested content from the previewer as the initialization process of preview file for reference to produce requested number of preview files for reference with the contents having been cleared, and thereafter, the step moves to the step S714 to wait for a request from the previewer. In addition, at the time of the initialization process of the step S718, a table (data table) exemplified in FIG. 15 is also initialized with cells corresponding to the initialized file being, for example, renewed with null data.

The step S721 determines the type of the request of the previewer, and if it is a request for print canceling, the step moves to the step S725 in order to cancel the print process of the print job to implement the canceling process of the print job in the preview processing to move to the step 726 while if it is not a request for print canceling, the step moves to the step S722. The step S722 determines the type of the request of the previewer, and if it is a request for starting print, the step moves to the step S726 in order to implement a normal print process while if it is not a request for starting print, the step moves to the step S723. In addition, the step S726 deletes the preview files produced in the step S721 and the step S718, and the subsequent step 727 notifies the OS of the finalization of the preview process to finalize the preview thread process of the print processor.

The step S722 determines the type of the request of the previewer, and if it is a request for preview image production, the step moves to the step S731 to implement the preview image production process while if it is not a request for preview image production, the step moves to the step S724 to implement processing of the other requests. Among the types of requests of the previewer, the step S724 implements the processes of requests other than the print start request, the print cancel request and the preview image production request, and, for example, make preparations for all the pages as a response to the previewer when the number of all of the entire pages (the number of entire pages) printable have been requested, or, for example, if the request is an inquiry whether or not the print data of the application are being spooled, prepares as a response to the previewer a flag on whether or not being spooled, and prepares a response suitable for the request, and thereafter responds to the previewer. Finishing the response, the step moves to the step S714 and waits for a request from the previewer. In addition, in case of a request for deletion of contents of the preview file for reference, the contents of the preview file for reference of the designated file number is nullified and completion of operation is responded to the previewer.

The previewer displays the number of all the pages (3 pages in the example of FIG. 4) obtained in accordance the request as the number of entire pages shown in the bottom region in the display screen exemplified in FIG. 4. In addition, in the case where the button in the rightest end among four buttons of the buttons 403 shown in FIG. 4 has been pushed, the last page can be previewed since the number of entire pages is known.

The step S731 obtains the contents of the request from the previewer to obtain information necessary for preview image production process. At this time, the information of the requested contents notified from the previewer is, for example, the page number of the print page data that the print processor produces or resolution of the image to be produced, or otherwise the number of the preview file from reference where the preview image to be produced is stored. Thus a part of information of the requested contents obtained is notified to the printer graphic driver, and is used, for example, in order to produce a preview image with a designated resolution.

Next, the step S732 nullifies the contents in the preview file for production, and thereafter stores the print conditions corresponding with the print page data of the requested page number into the preview file for production. The subsequent step S733 notifies the print function of the OS with the page layout start. In addition, the step S734 reads out the print data from the EMF spool file to implement the layout process and produces the print page data of the page number which the previewer has requested. The step S735 notifies the print function of the OS with the page layout finalization. At this time, the printer graphic driver generates a bit map image from the print page data produced in the step S734 to store into the preview file for production additionally as a preview image.

Next, the step S736 replaces the contents of the preview file for reference of the requested number with the completed contents of the preview file for production, responds with the file name of the preview file for reference of the requested number as a response to the request for preview image production of the previewer, and moves to the step S714 to wait for a request from the previewer.

Here, after the contents of the preview file for reference are replaced with the contents of the preview file for production, nullifying the contents of the preview file for production, the memory capacity for use can be made less. In addition, the previewer correlates the file name of the preview file for reference in receipt of response with the resolution for the preview object and the page number of the preview object to registrate in the table (data table) exemplified in FIG. 15, obtains the preview image for the designated page number from the preview file of the responded file name, and displays a display screen on the display as exemplified in FIG. 4.

FIG. 11 shows a flow chart at the time when an interface for printing of the print processor has been called out (the step S671) by the spooler. The flow in the print process is not different from that of the print processor with the standard specifications, and therefore, will be described briefly. Firstly, the step S701 obtains the print setting from the EMF spool file and obtains setting on the number of copies or a reverse order printing and the like. Subsequently, the step S702 notifies the print function of the OS with the print start. The subsequent steps S703 through S707 constitute a loop in order to print each of the physical page up to the last physical page to be printed. If the step S707 has not yet finished printing all of the designated physical pages, the print process of the physical pages continues to the step S704. After all of the designated physical pages have been printed, the step goes forward to the step S708 to notify the print function of the OS of the print process finalization. The step S704 notifies the print function of the OS of the page layout start. The step S705 reads out the print data from the EMF spool file to implement the layout process and produces the print page data corresponding with respective physical pages. The step S706 notifies the print function of the OS with the page layout finalization. At this time, the GDI produces graphic drawing command from the print page data to deliver to the printer graphic driver. In addition, as the step S701 notifies of the actual print process as described above and the step S706 notifies of the page layout finalization, the printer graphic driver generates the bit map data from the print page data, converts the generated bit map data into the print command and supplies the language monitor with the print command, which in turn the language monitor supplies to the printer via predetermined data transmission means, and thereby the physical page for the applicable page is printed.

Here, the printer graphic driver is capable of generating print data in a plurality of forms, and not necessarily generates the print data in a bit map form, but may generate the print data in a designated form. However, it is a print data to be supplied to the printer and in the present embodiment, the preview image is generated in a bit-mapped form.

As described above, in the preview thread process, the print processor operates according to the request of the previewer to realize the preview function, and in the print thread process, the conventional operation is implemented to realize the print function of the print job. Here, since a print processor with the standard specifications of the OS does not have an interface for preview, the interface for printing is called in the thread for printing at the time of printing, and thus conventional print process can be implemented.

In addition, in the above described present embodiment, the print processor started up the previewer if the preview setting of the print setting is "ON", but judgment whether or not to start up the previewer may further reflect the other conditions. As the other conditions, the case where preview settings for each printer or each printer job are preferred although the above described print settings are set on a printer job bases may be considered and, for example, inquiry from the print processor to the main body of the printer via the language monitor whether or not there exists any preview or reference to the setting values of the common memory region (registry) that the print function of the OS controls, and the like may be nominated.

In addition, in the above described embodiment, in the case where the print processor comprises an interface for preview, the spooler produces the subthread for preview to call the print processor and the print processor judges the setting values of the preview setting based on the print settings to start up the previewer, but such a form may work as well that the spooler judges the setting values of the preview setting of the print settings and produces the subthread for preview to call out the print processor if the preview setting is "ON". However, it goes without saying that the preview setting in this case must exist in the print setting to which the spooler is allowed to make an access, and not in the print setting that the printer driver keeps individually.

(Process of Previewer)

Figure 14:
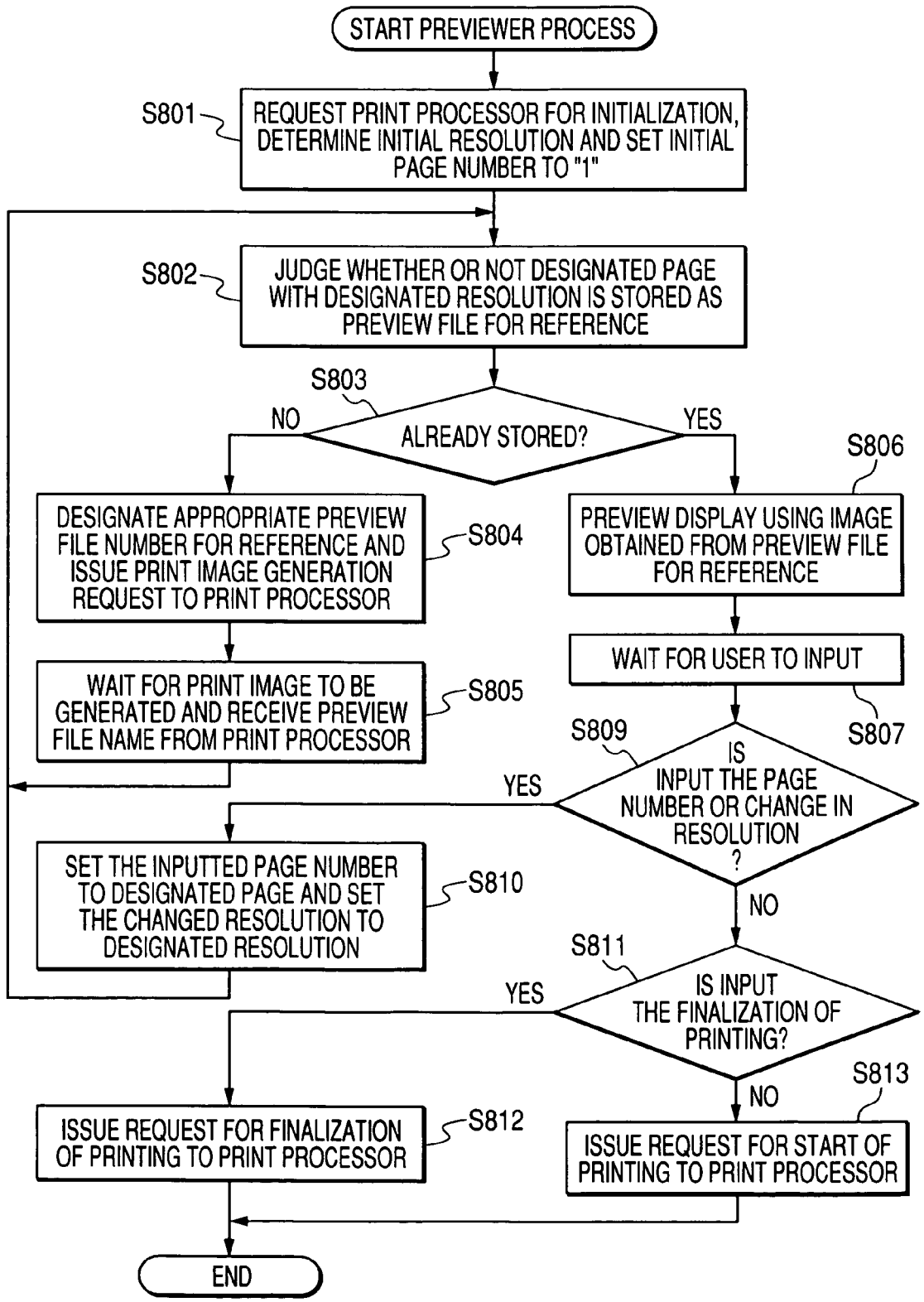
FIG. 14 is a flow chart showing a process by a previewer related to the present embodiment.

FIG. 14 is a flow chart showing a process by a previewer related to the present embodiment started up in the step S712. The previewer is started up by a print processor to execute its process, and the exchange of messages and data with the print processor is as aforementioned, and therefore description thereof will be omitted here.

The step S801 sets the page number of the preview image to be displayed as the initial value to "1", determines the resolution at the time of requesting for print image generation and moreover issues request to the print processor for initialization. Subsequently, the steps S802 and S803 determine whether or not the designated page to become an object for preview display has already been generated and stored in any of preview files for reference which may exist singly or in plurality. This determination is implemented with reference to a table (data table) in a data configuration exemplified in FIG. 15. That is, FIG. 15 is a table exemplifying the data configuration of the data table describing the already registered preview file for reference related to the present embodiment, and in the present embodiment, as an example, data of respective items of filename, page number and resolution are stored under the given file number 800, and the step S803 searches whether or not the designated page of the designated resolution is registered, and determines that an applicable preview file for reference exists if applicable cell is found in the applicable table as a result of the search.

In addition, if the step S803 determines that there exists an applicable preview file for reference, the step S806 reads out the image data from the preview file for reference to display as a preview image. On the other hand, if there exists no applicable preview file for reference, the step S804 designates the number of the preview file for reference where the generated image data are stored and issues to the print processor a request for print image generation on that designated page, and the subsequent step S805 waits until the image data are generated and upon production of the image data sets the preview file name delivered from the print processor to the applicable file number in the data table in FIG. 15, and moves to the step 802.

Here, in case of the step 803 determining that no applicable preview file for reference exists in the preview files for reference, a new preview file will be produced, and at that time, in such a case where the host computer is expected to be short of the disk space, a request for deletion of the number of unnecessary preview file for reference among the preview files from reference registered in the data table exemplified in FIG. 15 as well as the contents of the preview file for reference may be issued to the print processor prior to the request for print image generation.

The step S806 implements preview display according to the above described procedure, and thereby the display screen exemplified in FIG. 4 is displayed on the display. At this time, a request for print image generation on the designated page is issued to the print processor, and in receipt of notification of the produced preview file name for reference from the print processor, the data table exemplified in FIG. 15 is renewed and preview display is implemented according to the procedure in the step S802.

Subject to preview display, the steps S807 and S809 wait for a user to operate inputting to the display screen exemplified in FIG. 4, and in case of detecting an input operation, determine whether or not that operation is a change of page number or a change of display size. In addition, if as a result of that determination, the input operation of the user turns out to be either a change of page number or a change of display size, the resolution calculated from the designated page and the designated display size is changed and the step moves to the step S802 in order to switch the preview display.

On the other hand, if as a result of the above described determination, the input operation of the user turns out not to be either a change of page number or a change of display size, the step S811 determines whether or not such an input operation of the user is the finalization of printing, and in the case where the result of that determination is the finalization of printing, the step S812 issues a request for finalization of printing to the print processor, and on the other hand, in case of other than finalization of printing, the step S813 issues a request for start of printing to the print processor.

(Summary of Preview Display Procedure)

Figure 16:
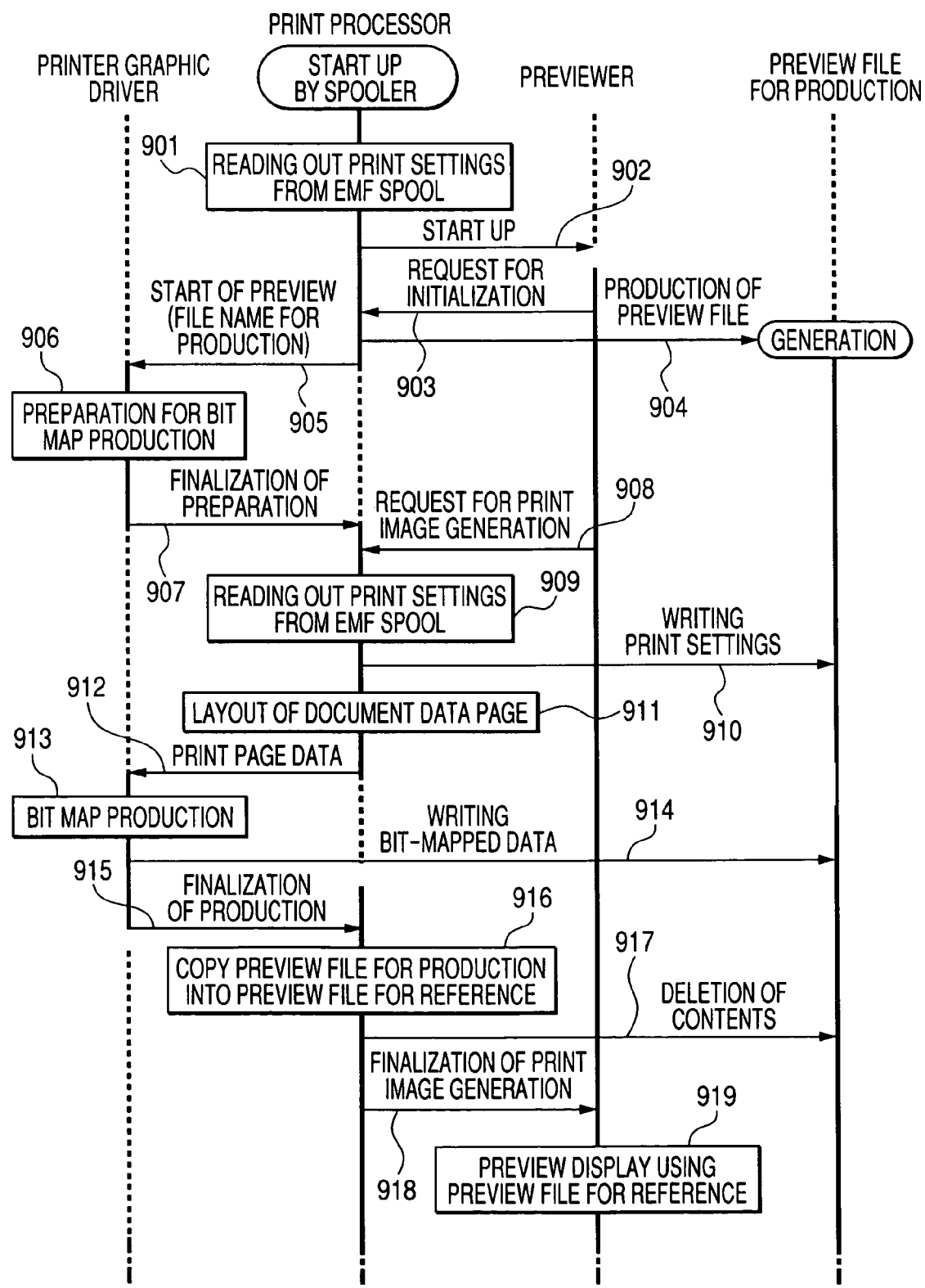
FIG. 16 describes sequences for implementing preview display on the first page related to the present embodiment.

FIG. 16 describes sequences for implementing preview display on the first page related in a document having a print object in the configuration in FIG. 1. In the following descriptions, numerals in the parentheses denote the reference numerals indicated in FIG. 16. Here, in order to make descriptions simple, the GDI being intermediate between the print processor and the printer graphic driver is omitted.

The spooler produces a subthread for preview at the time of implementation of preview process of a print job to call the interface for preview of the print processor. The print processor called by the spooler reads out the print settings from the EMF spool at first (the step 901), confirms that the setting of preview display in the print settings is "ON" and starts up the previewer (the step 902). Starting up, the previewer requests the print processor for initialization (the step 903) and thereby notifies of the number of preview files for reference to be used. In receipt of the request for initialization from the previewer, the print processor produces one preview file for production (the step 904). In addition, although not shown in the drawing, the designated numbers of preview files for reference are also produced in the preview.

Subsequently, the print processor notifies the printer graphic driver of the start of preview start via the GDI (the step 905) and the printer graphic driver prepares for producing a bit map for preview (the step 906). When the preparation by the printer graphic driver is over (the step 907), the print processor waits for a request from the previewer. When the previewer requests the print processor for print image generation of the first page which the previewer displays display at first (the step 908), the print processor reads out the print settings of the designated page from the EMF spool (the step 909), and writes print settings into the preview file for production (the step 910). Here, a request for print image generation includes information such as the number of the preview file for reference, resolution and the like other than the page number.

Subsequently, in order to produce the bit map for preview of the designated print page, the print processor implements layout process of the page via the GDI (the step 911), and the print processor calls the GDI, then the GDI converts the intermediate data spooled in the EMF spool file into print data interpretable to the printer graphic driver to supply it to the print page designated by the printer graphic driver (the step 912). The printer graphic driver produces a bit map for preview from the supplied print data (the step 913) and writes the produced bit-mapped data additionally into the preview file for production (the step 914). When the bit map production operation by the printer graphic driver is over (the step 915), the print processor copies the contents of the completed preview file for production to the preview file for reference designated by the previewer (the step 916), and deletes the contents of preview file for production (the step 917).

Subsequently, the print processor notifies the previewer of finalization of print image generation (the step 918), and then the previewer utilizes print settings stored in the preview file for reference and the bit-mapped data to implement preview display (the step 919).

Thus, the present embodiment generates preview image data for preview display with a printer graphic driver according to the above described procedure, and as a result, accurate preview image data utilizing print data spooled with an operating system, that is, generation of preview image data enabling preview display in an aspect as in case of actual printing onto recording stock paper and the like is realized. In addition, according to operations to the previewer by a user, the process of the steps 908 to 919 in the drawing is repeated and thereby switching of page to be previewed and changes in display sizes can be implemented.

Incidentally, so far it has been described that a preview function will become providable by adding functions to existing spoolers, print processors and printer graphic drivers and moreover by preparing a previewer, and in case of using Windows® as OS, preview-related modules included in the printer driver provided by a vender that manufactures printers are blocks in the shaded regions in FIG. 1, and in particular, are the user interface driver, the print processor, the printer graphic driver and the previewer. Here, since, in the preview function in the present embodiment, the spooler being a module of the OS has also undergone alterations, it goes without saying that addition of alterations to the spooler by the vendor producing the OS will enable a number of venders that provide printers and printer drivers to utilize preview functions.

(Hardware Configuration of Printing System)

Next, the hardware configuration of the printing system related to the present embodiment will be described. FIG. 2 is a block diagram showing a configuration of a printing system of the present embodiment of the present invention.

Figure 2:
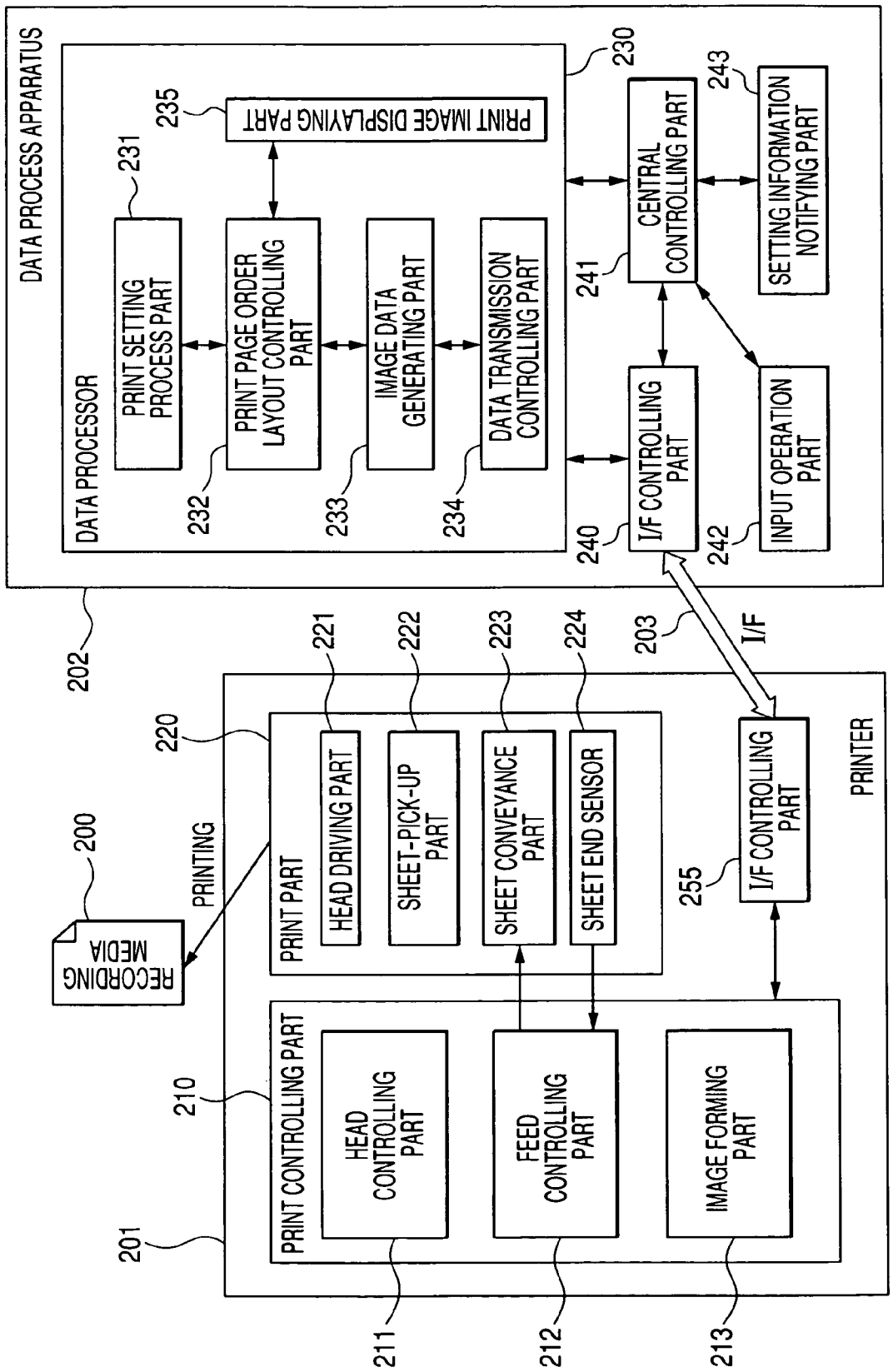
FIG. 2 is a block diagram showing a configuration of a printing system of the present embodiment.

In FIG. 2, the printer 201, which is a printing apparatus in an ink jet system to implement image forming, implement image forming based on a print command generated by a later-described data process apparatus 202. Types of printing apparatus will not be an issue in particular, and here a color printer in an ink jet system is assumed. In addition, as types of printer other than this, printers in the laser beam system, the thermal transfer system and the like for example can be nominated. The printer 201 is configured by respective kinds of function blocks 210 to 213 and 220 to 225.

A data process apparatus 202 comprises an application software producing a print job and a printer driver producing image data from a print order of a print job to generate a print command for controlling print operations of the connected printer 201. The present embodiment uses a personal computer as the data process apparatus 202. In addition, this data process apparatus 202 acts to receive instruction and inputs on print settings from users. The data process apparatus 202 is configured by respective kinds of function blocks 230 to 235 and 240 to 243. In addition, an OS for controlling data process apparatus 202, for example, Microsoft Windows® XP is incorporated in the data process apparatus 202, and respective kinds of function blocks operate on this OS. A communication interface (I/F) 203 is a communication interface for bringing the data process apparatus 202 and the printer 201 into connection. In the present embodiment, as the communication interface 203, a USB being a serial interface is assumed, otherwise serial interfaces such as IEEE1394, Ethernet®, IrDA, IEEE802.11 and an electric power line can be assumed. In addition, without being limited to serial interfaces, respective kinds of interfaces such as Centronics and SCSI can be assumed as parallel interfaces. In any event, whether fixed line or wireless, any communication interface which realizes bilateral communication between the data process apparatus 202 and the printer 201 will do.

Here, on both of the printer 201 and the data process apparatus 202, such functions that deem not to be necessary in particular for describing the characteristics of the present embodiment will be omitted.

In the printer 201, a print controlling part 210 receives a print command transmitted from the data process apparatus 202 to control print operations of the print part 220. The print part 220 is a part to convey recording media 200 and implement printing onto the recording media 200. The recording media 200 is generally called print stock paper, and shall be compiled in a paper feeding part such as a feeding paper tray and a cassette fitting with the printer 201. A head controlling part 211 controls operations of a head driving part 221 to cause ink to be discharged from an orifice of an ink-jet head. A feed controlling part 212 controls the sheet conveyance part 223 in order to feed the recording media 200 sheet by sheet from the feeding paper tray or feeding paper cassette fitted to the print 201, conveys it to a printable position via a predetermined locations on the sheet conveyance path, and implements raster print as well as the paper output operation. An image forming part 213 spreads out image data included in the print command issued from the data process apparatus 202. The print controlling part 210 is provided with a memory for the work region of control operation by the print controlling part 210, the spread of image data and storage of the print command in receipt, and the memory is used by image forming part 213.

Thus the print controlling part 210 comprehensively controls the image forming part 213 being the printer engine in accordance with the command for print controlling included in the print command. In particular, the print controlling part 210 can be realized by executing a program containing the procedure for controlling described by the (not shown) CPU. In addition, as the command for print controlling, respective kinds of command configured by quantized image data for printing (binary or intermediate data prior to undergoing binary process) and the implanted ink volume, path number, respective kinds of command for controlling printing directions as well as the quantity of printing stock paper to be conveyed and instructions on sheet types set in an input operation part 231 to be described later. The head driving part 221 implements printing onto the recording media 200 based on the image data of the print command spread out in the print controlling part 210. The printer 201 is a printer in an ink-jet system and therefore implements image forming by discharge of ink from the ink-jet head. A sheet-pick-up part 222 implements an operation of placing onto the conveyance path the recording media 200 piled in the feeding paper tray or the feeding paper cassette. A sheet conveyance part 223 implements operations of conveying the recording media 200 placed on the conveyance path by the sheet-pick-up part 222 along the conveyance path via the predetermined locations to paper output operation. A sheet detection sensor 224 is equipped in a location on the conveyance path, detects an end part of the recording media 200 in mid-conveyance to confirm that the recording media 200 is in the predetermined location in the conveyance path. An I/F (interface) controlling part 225 is an I/F controlling part governing the interface function of the printer 201. The present embodiment uses a USB as an interface, and therefore is configured by controller at the side of the peripheral device of the USB. The I/F controlling part 225 implements transmission of information on sheet types and data reception of print commands and the like. In addition, in receipt of a request, the I/F controlling part 225 also transmits to the data process apparatus 202 errors that have occurred in the main body of the printer 201 and status information such as transmission status.

In the data process apparatus 202, the central controlling part 241 controls respective kinds of functions of the data process apparatus 202 and this corresponds to the function that the CPU has. An input operation part 242 is configured by respective kinds of input devices (a mouse, a keyboard, a touch panel and the like) for making intentions of a user reflect on input settings. A setting information notifying part 243 notifies the user of print settings. As concerns a notifying method, a notifying method in case of using display apparatus (CRT and LCD) such as monitors or by way of sounds and voices. The I/F controlling part 240 governs interface functions of the data process apparatus 202. The I/F controlling part 240 is configured by the controller at the host side of the USB and has functions as the USB host. A part of the functions as a USB host is also configured by software such as an OS and a driver.

A printer driver 230 is software for implementing respective settings, generation of print data and control of the printer 201 for printing on the data process apparatus 202. The central controlling part 241 (that is, the CPU of a personal computer) executes the program of the printer driver 230 so as to realize functions of respective function blocks such as a print setting process part 231 being a user interface driver, a print page order layout controlling part 232 being a print processor, an image data generating part 233 being a printer graphic driver, a data transmission controlling part 234 being a language monitor, a print image displaying part 235 being a previewer and the like. The print setting process part 231 implements respective types of print settings including settings on printing stock paper, settings on print qualities and the like. In addition, the print setting process part 231 has functions to receive instruction and inputs from a user and display or notify the set contents. The print page order layout controlling part 232 controls the page order and the layout of print data of the print job produced by an application and supplies the image data generating part 233 with the print data on a single page basis. The image data generating part 233 produces image data from the print data supplied by the print page order layout controlling part 234 to generate a print command. The print command of the print job produced by the image data generating part 233 is transmitted to the I/F controlling part 240 via the data transmission controlling part 233 and the print command is transmitted to the printer 201. In addition, the image data that the image data generating part 233 has generated are occasionally supplied to the print image displaying part, and in such a case, the print image displaying part provides a user with the print image in a visible form.

(Configuration of Printer)

Subsequently, a schematic configuration of an ink-jet printer being an example of a printer will be described with reference to FIG. 17. FIG. 17 is a diagram showing a schematic configuration of an ink-jet printer of an embodiment of the present invention. Here, functions deemed unnecessary in particular for describing characteristics of the embodiment will be omitted.

An ink-jet head 1000 is brought into both-way scanning along the direction perpendicular to the sheet surface in the drawing, and ink is discharged to the portion facing the ink-jet head 1000 (this will be called as a recording location). The printing stock paper P being recording media 100 is conveyed in a predetermined quantity every single scanning by the ink-jet head 1000. The printing stock paper P is housed in a sheet feeding cassette 1004 and a sheet feeding tray 1006 for automatic sheet feeding both provided removably to the main body of the printer, and undergoes sheet feeding selectively in accordance with print settings in the print setting dialogue (for example in FIG. 3) realized on the data process apparatus. In the upper portion of the sheet feeding cassette 1004, which is in a mounted state, a sheet feeding conveyance roller 1008 is disposed at the tip portion of the stock paper. The sheet feeding conveyance roller 1008 is brought into pressure contact with the top printing stock paper P put on the sheet feeding cassette 1004. Therefore, the sheet feeding conveyance roller 1008 is driven so that the top printing stock paper P is supplied to the recording location. The sheet feeding conveyance roller 1010 is disposed in the sheet feeding tip portion of the sheet feeding tray 1006. The sheet feeding conveyance roller 1010 is brought into pressure contact with the top printing stock paper P in the sheet feeding tray 1006 with a sheet feeding tray cam at the time of printing. Therefore, the sheet feeding conveyance roller 1010 is driven so that the top printing stock paper P is brought into sheet feeding. With this configuration, the sheet feeding conveyance roller 1010 or 1008 at the side implementing sheet feeding from either the sheet feeding tray 1006 or the sheet feeding cassette 1004 is selectively driven so that the top sheet of the printing stock paper P (hereinafter a sheet of the printing stock paper P also to be called as a sheet) in the sheet feeding cassette 1004 or the sheet feeding tray 1006 is brought into sheet feeding.

Any size of printing stock paper can be set in the sheet feeding tray 1006, and a user can set another printing stock paper in a size different from the size of the sheet feeding cassette 1004. The printing stock paper P having undergone sheet feeding selectively from the sheet feeding cassette 1004 or the sheet feeding tray 1006 is sent into the location of the conveyance roller 1016 disposed in front of the print location where the ink-jet head 1000 is provided. The conveyance roller 1016 is configured to once halt the printing stock paper P having undergone sheet feeding and arrived so as to start conveyance to the print location of the ink-jet head 1000 in synchronization with an print operation. A platen 1002 is provided for supporting the printing stock paper P from the rear surface and stabilizing the print state in the print location facing the ink-jet head 1000. The ink-jet head 1000 and the platen 1002 configure a print part in the print location. The ink-jet head 1000, which is provided with an orifice for discharging ink dots at the side facing the print face of the printing stock paper P, causes ink supplied by the ink supply part to be discharged from an orifice with the head driving part. Being brought into both-way scanning along the direction (main scanning direction) perpendicular to the conveyance direction (secondary scanning direction) of the printing stock paper P, that is, the direction perpendicular to the sheet surface of the printing stock paper P being conveyed from left side to the right side in FIG. 17, the ink-jet head 1000 discharges ink dots to form a visible image corresponding with the image data configured by a plurality of rasters onto the print surface of the printing stock paper P.

Here, when scanning by the ink-jet head 1000 is implemented, conveyance of the printing stock paper P is halted and brought into one-way scanning, and at the time when image forming for one scanning is finalized, conveyance of the printing stock paper P in the quantity corresponding with the printed raster number. Repetition of this operation for each direction of the both-way scanning forms a print image of the image data for a page onto the printing stock paper P. The printing stock paper P having passed the print location facing the ink-jet head 1000 is discharged out of the main body of printer 101 via the discharge roller 1018 disposed at a the downstream side in the print location. A discharge tray 1020 is provided in the location for discharging and a sheet subject to printing is discharged into the discharge tray 1020 with the print image coming upside. When the print command of the subsequent page is transmitted from the data process apparatus 102, the printer 101 controls so as to start sheet feeding of the next printing stock paper P to travel to reach the conveyance roller 1016. In case of sheet feeding from the sheet feeding cassette 1004, the printing stock paper P having undergone sheet feeding is reversed and then conveyed to the conveyance roller 1016, and therefore reverse supporting rollers 1012 and 1014 are provided on the conveyance path from the sheet feeding cassette 1004 to reach the conveyance roller 1016 for supporting the printing stock paper P at the time of reversing operation A printing stock paper detection sensor 1022 is provided at the upstream side of the conveyance roller 1016 and detects whether or not the printing stock paper P undergoing sheet feeding from the sheet feeding tray 1006 or the sheet feeding cassette 1004 exists. This printing stock paper detection sensor 1022, which may be in the mechanical system such as a micro switch and the like or in the optical system such as a photo sensor and the like, outputs existence notifying signal when a sheet exists and non-existence notifying signal when a sheet does not exist. The printing stock paper detection sensor for detecting the stock paper P outputs a signal indicating existence of a sheet when the tip of a sheet passes, and outputs a signal indicating non-existence of a sheet after the sheet has passed, and thus the front end as well as the back end of printing stock paper is detected. Thereby, correct completion of sheet discharge process of a sheet will become feasible.

Advantages of the Present Embodiment

As having been described with reference to the process sequence shown in FIG. 16 as well as flow charts shown in FIGS. 6A and 6B, FIG. 7 and FIG. 8, and FIG. 11 or FIGS. 12A and 12B, and FIG. 14, the present embodiment employs a process configuration of causing the print processor called by the spooler at the time of production of a print job to be intermediate between the request for preview from the previewer and image data generation by the printer graphic driver, and, in such a process configuration, to make the printer graphic driver produce image data for preview display so as to deliver the produced image data to the previewer in accordance with an instruction of the print processor, and thereby enables display of preview image onto a display without being kept having to wait until the print data undergo an actual print process as in a conventional case.

In addition, according to the present embodiment, a sub-thread for preview is used at the time when each print job is produced, and therefore, preview of a plurality of print jobs can be implemented simultaneously. That is, it will become feasible for a user to simultaneously implement preview display of a plurality of print jobs or it will become feasible for a plurality of users to simultaneously implement preview display of their respective print jobs.

In addition, the present embodiment can set the number of print jobs that can be brought into preview display at the same time, and therefore is capable of structuring optimum environment on the occasion of providing preview functions corresponding with process capability of the host computer or conditions such as the number of users utilizing the host computer at the same time.

In addition, the present embodiment has been made to administrate the preview process state for respective print jobs and made to be capable of implementing an actual print process only for a print job that has already undergone process of the preview process, and therefore will become capable of bringing a print job into a print process even if another job already in a preview process to which a printer queue is assigned exists. Accordingly, inefficient time consumption of a printer will be reduced so as to enable a print process to be implemented efficiently.

According to the embodiment of the present invention as described above, it will become possible to provide a user with a comfortable preview function in such a fashion that alteration of spooler of an OS provides a frame of a preview function of a print job and alteration of a printer driver enables simultaneous preview display of a plurality of print jobs and further enables implementation of print process of a print job, skipping another print job already in a preview process.

This application claims priority from Japanese Patent Application No. 2004-218823 filed Jul. 27, 2004, which is hereby incorporated by reference herein.

What is claimed is:

1. A computer-readable storage medium for storing a computer-executable program which utilizes a spooler which uses an operating system standard spool file for spooling intermediate data converted from print data supplied from an application, wherein the computer-executable program comprises:
   a preview module for executing preview based on a bit map produced based on the spooled intermediate data; and
   a print processor module,
   wherein in response to an event of start of formation of print data, the spooler sets a job printing flag to off, generates a preview thread, calls the print processor module to start the preview module, and sets a job preview status to processing,
   wherein in response to an event of finalization of a preview thread, the spooler sets the job preview status to already processed, and
   wherein in response to an event of finalization of a print thread, the spooler determines a job for which the job printing flag is off and the job preview status is already processed as a job to be printed next, generates a print thread, calls the print processor module to perform a printing process, and sets the job printing flag to on.

2. A medium according to claim 1, wherein the spooler determines whether the print processor module corresponds with a preview function, and wherein when it is determined that the print processor module does not correspond with a preview function, the spooler sets the job preview status to already processed, generates a print thread, calls the print processor module to perform a printing process, and sets the job printing flag to on.

3. A computer-readable storage medium for storing a computer-executable program which utilizes a spooler which uses an operating system standard spool file for spooling intermediate data converted from print data supplied from an application, wherein the computer-executable program comprises:
   a production module for producing a bit map based on said spooled intermediate data;
   a preview module for executing preview based on a bit map produced by said production module; and
   a print processor module,
   wherein in response to an event of start of formation of print data, the spooler sets a job printing flag to off, generates a preview thread, calls the print processor module to start the preview module, and sets a job preview status to processing,
   wherein in response to an event of finalization of a preview thread, the spooler sets the job preview status to already processed, and
   wherein in response to an event of finalization of a print thread, the spooler determines a job for which the job printing flag is off and the job preview status is already processed as a job to be printed next, generates a print thread, calls the print processor module to perform a printing process, and sets the job printing flag to on.

4. A computer-readable storage medium according to claim 3, wherein said production module implements a generation process of a print image to be printed by a printer and a conversion process to provide a print command interpretable to the printer.

5. A computer-readable storage medium for storing a computer-executable program which utilizes a spooler which uses an operating system standard spool file for spooling intermediate data converted from print data supplied from an application, wherein the computer-executable program comprises:
   a user interface driver for implementing print settings of a print job issued by an application program;
   a print processor module for arranging print data of each page of the print page issued by the application program on a page-by-page basis under the state of page-description language;
   a previewer module for starting operation in accordance with the start of said print processor module;
   a printer graphic driver for generating image data to convert it into a print command interpretable to the printer; and
   a language monitor module for supplying the printer with the print command,
   wherein in response to an event of start of formation of print data, the spooler sets a job printing flag to off, generates a preview thread, calls the print processor module to start the preview module, and sets a job preview status to processing,
   wherein in response to an event of finalization of a preview thread, the spooler sets the job preview status to already processed, and
   wherein in response to an event of finalization of a print thread, the spooler determines a job for which the job printing flag is off and the job preview status is already processed as a job to be printed next, generates a print thread, calls the print processor module to perform a printing process, and sets the job printing flag to on.

6. An information processing apparatus utilizing a spooler which uses an operating system standard spool file for spooling intermediate data converted from print data supplied from an application, comprising:
   a preview unit constructed to execute preview based on a bit map produced based on the spooled intermediate data; and
   a print processor unit,
   wherein in response to an event of start of formation of print data, the spooler sets a job printing flag to off, generates a preview thread, calls the print processor unit to start the preview unit, and sets a job preview status to processing,
   wherein in response to an event of finalization of a preview thread, the spooler sets the job preview status to already processed, and
   wherein in response to an event of finalization of a print thread, the spooler determines a job for which the job printing flag is off and the job preview status is already processed as a job to be printed next, generates a print thread, calls the print processor unit to perform a printing process, and sets the job printing flag to on.

7. An information processing apparatus according to claim 6, wherein the spooler determines whether the print processor unit corresponds with a preview function, and wherein when it is determined that the print processor unit does not correspond with a preview function, the spooler sets the job preview status to already processed, generates a print thread, calls the print processor unit to perform a printing process, and sets the job printing flag to on.

8. An information processing apparatus utilizing a spooler which uses an operating system standard spool file for spooling intermediate data converted from print data supplied from an application, comprising:
    a production unit constructed to produce a bit map based on the spooled intermediate data;
    a preview unit constructed to execute preview based on a bit map produced by said production unit; and
    a print processor unit,
    wherein in response to an event of start of formation of print data, the spooler sets a job printing flag to off, generates a preview thread, calls the print processor unit to start the preview unit, and sets a job preview status to processing,
    wherein in response to an event of finalization of a preview thread, the spooler sets the job preview status to already processed, and
    wherein in response to an event of finalization of a print thread, the spooler determines a job for which the job printing flag is off and the job preview status is already processed as a job to be printed next, generates a print thread, calls the print processor unit to perform a printing process, and sets the job printing flag to on.

9. An apparatus according to claim 8, wherein said production unit implements a generation process of a print image to be printed by a printer and a conversion process to provide a print command interpretable to the printer.

10. An information processing apparatus utilizing a spooler which uses an operating system standard spool file for spooling intermediate data converted from print data supplied from an application, comprising:
    a user interface unit for implementing print settings of a print job issued by an application program;
    a print processor unit for arranging print data of each page of the print page issued by the application program on a page-by-page basis under the state of page-description language;
    a previewer unit for starting operation in accordance with the start of said print processor unit;
    a printer graphic unit for generating image data to convert it into a print command interpretable to the printer; and
    a language monitor unit for supplying the printer with the print command,
    wherein in response to an event of start of formation of print data, the spooler sets a job printing flag to off, generates a preview thread, calls the print processor unit to start the previewer unit, and sets a job preview status to processing,
    wherein in response to an event of finalization of a preview thread, the spooler sets the job preview status to already processed, and
    wherein in response to an event of finalization of a print thread, the spooler determines a job for which the job printing flag is off and the job preview status is already processed as a job to be printed next, generates a print thread, calls the print processor unit to perform a printing process, and sets the job printing flag to on.

11. A preview method utilizing a spooler which uses an operating system standard spool file that spools intermediate data converted from print data supplied from an application, a preview unit that executes preview based on a bit map produced based on the spooled intermediate data, and a print processor, the method comprising:
    in response to an event of start of formation of print data, using the spooler to set a job printing flag to off, generate a preview thread, call the print processor module to start the preview unit, and set a job preview status to processing;
    in response to an event of finalization of a preview thread, using the spooler to set the job preview status to already processed; and
    in response to an event of finalization of a print thread, using the spooler to determine a job for which the job printing flag is off and the job preview status is already processed, as a job to be printed next, generate a print thread, call the print processor module to perform a printing process, and set the job printing flag to on.

12. A method according to claim 11, wherein the spooler determines whether the print processor module corresponds with a preview function, and wherein when it is determined that the print processor module does not correspond with a preview function, the spooler sets the job preview status to already processed, generates a print thread, calls the print processor module to perform a printing process, and sets the job printing flag to on.

13. A preview method utilizing a spooler which uses an operating system standard spool file that spools intermediate data converted from print data supplied from an application, a production unit that produces a bit map based on the spooled intermediate data, a preview unit that executes preview based on a bit map produced by the production unit, and a print processor module, the method comprising:
    in response to an event of start of formation of print data, using the spooler to set a job printing flag to off, generate a preview thread, call the print processor module to start the preview unit, and set a job preview status to processing;
    in response to an event of finalization of a preview thread, using the spooler to set the job preview status to already processed; and
    in response to an event of finalization of a print thread, using the spooler to determine a job for which the job printing flag is off and the job preview status is already processed, as a job to be printed next, generate a print thread, call the print processor module to perform a printing process, and set the job printing flag to on.

14. A method according to claim 13, wherein the production unit implements a generation process of a print image to be printed by a printer and a conversion process to provide a print command interpretable to the printer.

\* \* \* \* \*